United States Patent
Fukao et al.

(10) Patent No.: US 10,696,352 B2
(45) Date of Patent: Jun. 30, 2020

(54) BICYCLE OPERATING DEVICE

(71) Applicant: SHIMANO INC., Sakai (JP)

(72) Inventors: Kazutaka Fukao, Sakai (JP); Yasuhisa Watanabe, Sakai (JP)

(73) Assignee: SHIMANO INC., Sakai (JP)

( * ) Notice: Subject to any disclaimer, the term of this patent is extended or adjusted under 35 U.S.C. 154(b) by 175 days.

(21) Appl. No.: 15/857,481

(22) Filed: Dec. 28, 2017

(65) Prior Publication Data

US 2018/0118302 A1    May 3, 2018

Related U.S. Application Data

(60) Division of application No. 14/608,104, filed on Jan. 28, 2015, now Pat. No. 9,950,764, which is a continuation-in-part of application No. 14/249,300, filed on Apr. 9, 2014, now Pat. No. 9,637,195.

(51) Int. Cl.
  *B62K 23/02* (2006.01)
  *B62J 1/08* (2006.01)
  *B62K 23/06* (2006.01)

(52) U.S. Cl.
  CPC .............. *B62K 23/02* (2013.01); *B62J 1/08* (2013.01); *B62K 23/06* (2013.01)

(58) Field of Classification Search
  CPC .. B62K 23/02; B62K 23/06; B62J 1/08; B62J 2001/085
  See application file for complete search history.

(56) References Cited

U.S. PATENT DOCUMENTS

| | | | |
|---|---|---|---|
| 3,181,391 A | 5/1965 | Juy | |
| 3,861,740 A | 1/1975 | Tajima et al. | |
| 4,807,856 A | 2/1989 | Teckenbrock | |
| 4,872,696 A | 10/1989 | Gill | |
| 5,007,675 A | 4/1991 | Musto et al. | |
| 5,149,034 A | 9/1992 | Ganaja | |

(Continued)

FOREIGN PATENT DOCUMENTS

| | | |
|---|---|---|
| CN | 101293559 | 10/2008 |
| TW | 527301 B | 4/2003 |

OTHER PUBLICATIONS

Office Action with Form PTO-892 Notice of References Cited issued by the U.S. Patent and Trademark Office for the U.S. Appl. No. 14/608,104, dated Dec. 18, 2015.

*Primary Examiner* — Vicky A Johnson

(74) *Attorney, Agent, or Firm* — Mori & Ward, LLP

(57) ABSTRACT

A bicycle operating device comprises a base member, an operating member, an operating structure, and an operating unit. The operating member is movable relative to the base member between a rest position and an operated position. The operating structure includes a take-up member movable relative to the base member to move a first operation cable in a pulling direction and a releasing direction opposite to the pulling direction. The operating unit is mounted to the base member to operate a second bicycle component in response to an input operation from a user. The operating unit includes an electrical switch and a controller. The electrical switch is configured to receive the input operation from the user. The controller is configured to generate an operation signal to operate the second bicycle component in response to the input operation inputted from the electrical switch.

12 Claims, 18 Drawing Sheets

(56) References Cited

U.S. PATENT DOCUMENTS

| | | | |
|---|---|---|---|
| 5,829,733 A | 11/1998 | Becker | |
| 6,161,448 A | 12/2000 | Wang | |
| 6,619,154 B2* | 9/2003 | Campagnolo | B62M 25/08 |
| | | | 74/489 |
| 7,422,224 B2 | 9/2008 | Sicz et al. | |
| 7,806,022 B2 | 10/2010 | Hara | |
| 8,065,932 B2 | 11/2011 | Hara et al. | |
| 8,246,065 B1 | 8/2012 | Kodama et al. | |
| 8,393,244 B2* | 3/2013 | Watarai | B62K 23/06 |
| | | | 74/489 |
| 8,550,551 B2 | 10/2013 | Shirai | |
| 9,950,764 B2* | 4/2018 | Fukao | B62K 23/02 |
| 2002/0033064 A1 | 3/2002 | Ose | |
| 2008/0098848 A1 | 5/2008 | Dal Pra' et al. | |
| 2008/0257098 A1 | 10/2008 | Kawakami | |
| 2009/0158881 A1 | 6/2009 | Shahana | |
| 2011/0204201 A1 | 8/2011 | Kodama et al. | |
| 2012/0253606 A1 | 10/2012 | Takamoto et al. | |
| 2014/0137696 A1 | 5/2014 | Kosaka et al. | |
| 2014/0345411 A1* | 11/2014 | Miki | F16H 59/044 |
| | | | 74/473.12 |
| 2015/0009019 A1 | 1/2015 | Watarai et al. | |
| 2015/0073656 A1 | 3/2015 | Takamoto et al. | |

\* cited by examiner

BICYCLE OPERATING DEVICE

CROSS-REFERENCE TO RELATED APPLICATIONS

The present application is a divisional application of the U.S. patent application Ser. No. 14/608,104 filed Jan. 28, 2015, which is a continuation-in-part application of the U.S. patent application Ser. No. 14/249,300 filed Apr. 9, 2014, which has been issued as the U.S. Pat. No. 9,637,195. The contents of these applications are incorporated herein by reference in their entirety.

BACKGROUND OF THE INVENTION

Field of the Invention

The present invention relates to a bicycle operating device.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle operating device.

SUMMARY OF THE INVENTION

In accordance with an aspect of the present invention, a bicycle operating device comprises a base member, an operating member, an operating structure, and an operating unit. The base member is configured to be mounted to a bicycle part. The operating member is movable relative to the base member between a rest position and an operated position. The operating structure includes a take-up member movable relative to the base member to move a first operation cable in a pulling direction and a releasing direction opposite to the pulling direction. The take-up member couples the first operation cable to the operating member to move the first operation cable in the pulling direction to operate a first bicycle component in response to a movement of the operating member from the rest position to the operated position. The take-up member is configured such that the first operation cable is movable in the releasing direction in response to a release of the operating member from the operated position. The operating unit is mounted to the base member to operate a second bicycle component in response to an input operation from a user. The operating unit includes an electrical switch and a controller. The electrical switch is configured to receive the input operation from the user. The controller is configured to generate an operation signal to operate the second bicycle component in response to the input operation inputted from the electrical switch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
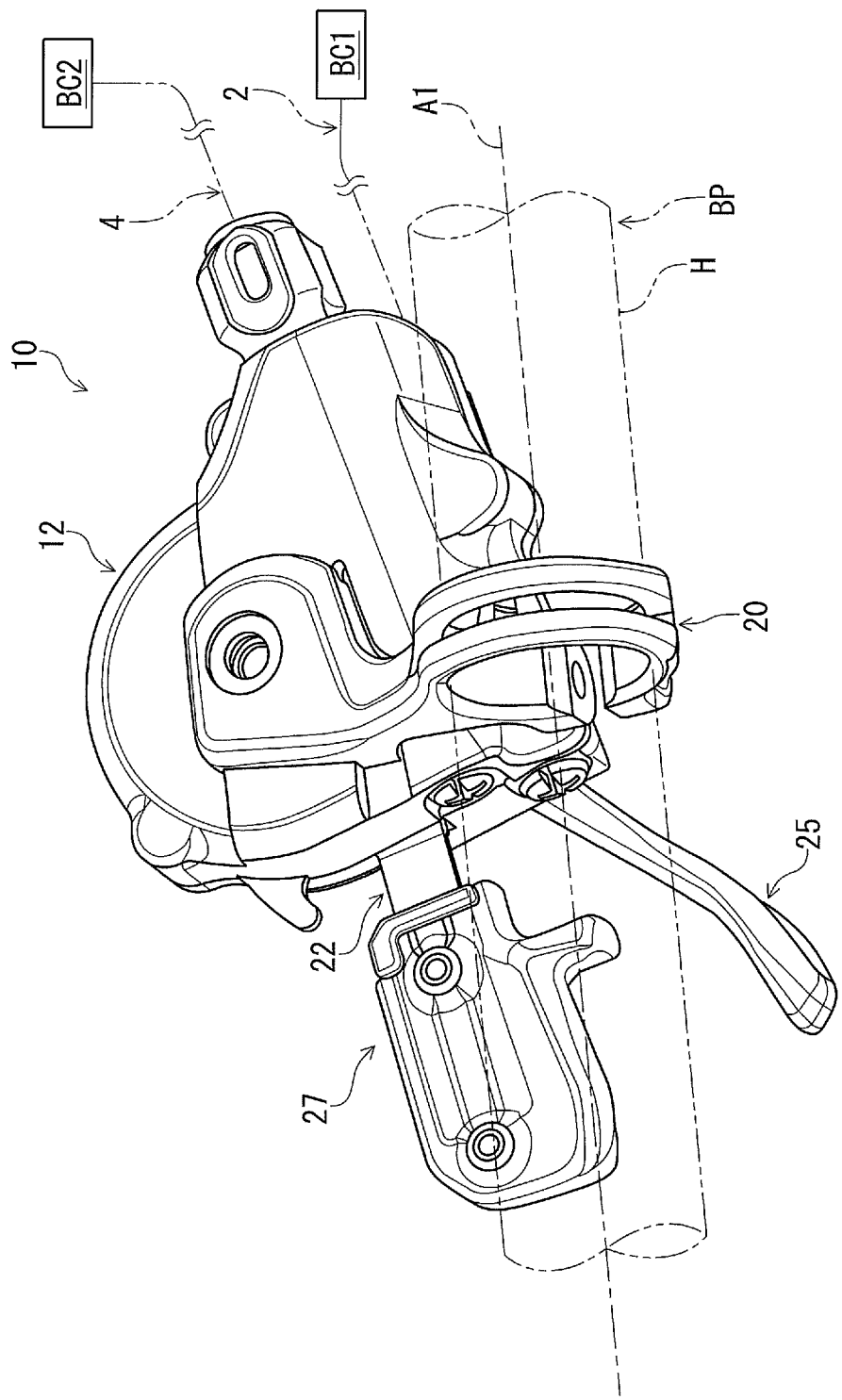
FIG. 1 is a perspective view of a bicycle operating device in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle operating device 10 in accordance with a first embodiment is configured to be attached to a bicycle part BP for operating a first bicycle component BC1. Possible examples of the bicycle part BP include a bicycle tube part such as a bicycle handlebar and a bicycle frame. In the illustrated embodiment, the bicycle part BP comprises a bicycle handlebar H extending along a longitudinal axis A1.

The bicycle operating device 10 is configured to operate the first bicycle component BC1 via a first operation cable 2. The bicycle operating device 10 is further configured to operate a second bicycle component BC2 via a second operation cable 4. In the illustrated embodiment, the first and second operation cables 2 and 4 are a mechanical cable such as a Bowden cable. The bicycle operating device 10 can, however, be configured to operate at least one of the first and second bicycle components BC1 and BC2 using structures other than an operation cable. For example, the bicycle operating device 10 can be configured to operate at least one of the first and second bicycle components BC1 and BC2 using a hydraulic operating structure.

Possible examples of each of the first and second bicycle components BC1 and BC2 include a bicycle transmission and a height adjustable seatpost assembly. In the illustrated embodiment, the first bicycle component BC1 comprises the height adjustable seatpost assembly. The second bicycle component BC2 comprises the bicycle transmission such as a front derailleur, a rear derailleur, and an internal hub transmission. In the illustrated embodiment, the second bicycle component BC2 comprises the front derailleur as the bicycle transmission. Since such bicycle components are well known in the bicycle field, they will not be described and/or illustrated in detail here for the sake of brevity.

Figure 2:
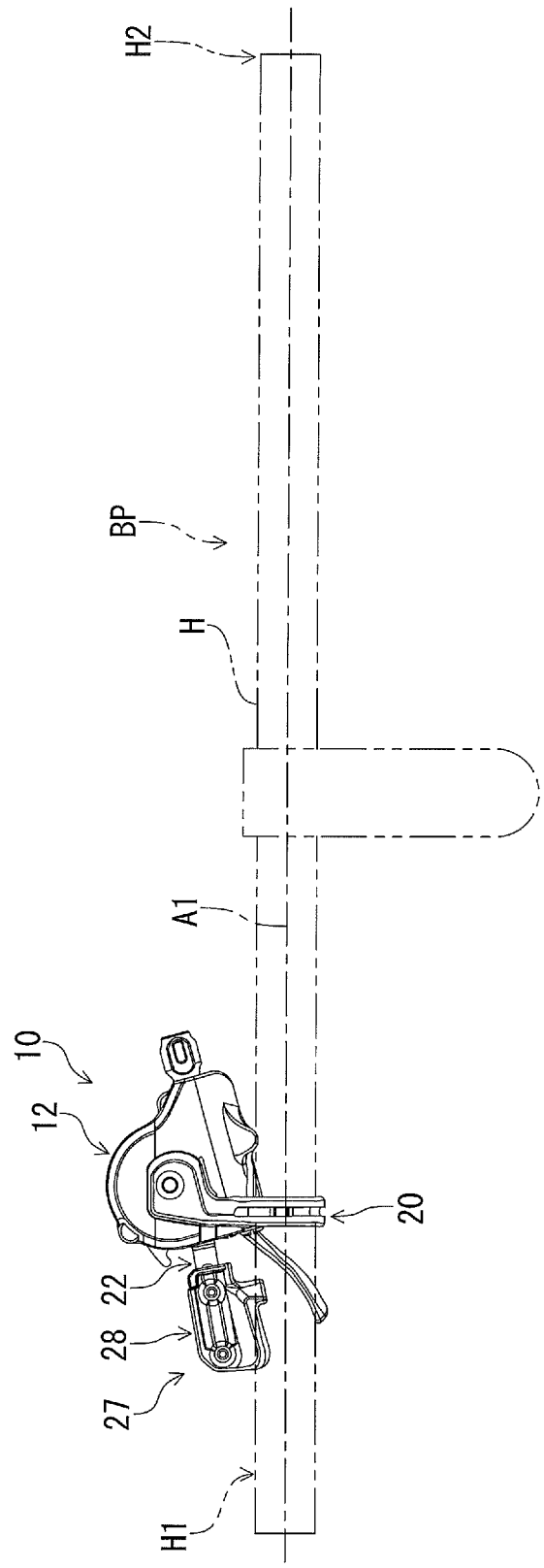
FIG. 2 is a plan view of a bicycle part to which the bicycle operating device illustrated in FIG. 1 is mounted.

As seen in FIG. 2, the bicycle handlebar H includes a first handlebar end H1 and a second handlebar end H2 opposite to the first handlebar end H1, for example. In the illustrated embodiment, the first handlebar end H1 is a left end of the bicycle handlebar H, and the second handlebar end H2 is a right end of the bicycle handlebar H. The bicycle operating device 10 is mounted to a left part of the bicycle handlebar H. The bicycle operating device 10 is a left bicycle operating device configured to be operated with a rider's left hand. However, it will be apparent to those skilled in the bicycle field from the present disclosure that the configuration of the bicycle operating device 10 can be applied to a right bicycle operating device.

In the present application, the following directional terms "forward", "rearward", "left", "right", "upward" and "downward" as well as any other similar directional terms refer to those directions which are determined on the basis of a user (e.g., a rider) who sits on a saddle (not shown) of a bicycle with facing the bicycle handlebar H. Accordingly, these terms, as utilized to describe the bicycle operating device 10, should be interpreted relative to a bicycle equipped with the bicycle operating device 10 as used in an upright riding position on a horizontal surface.

Figure 3:
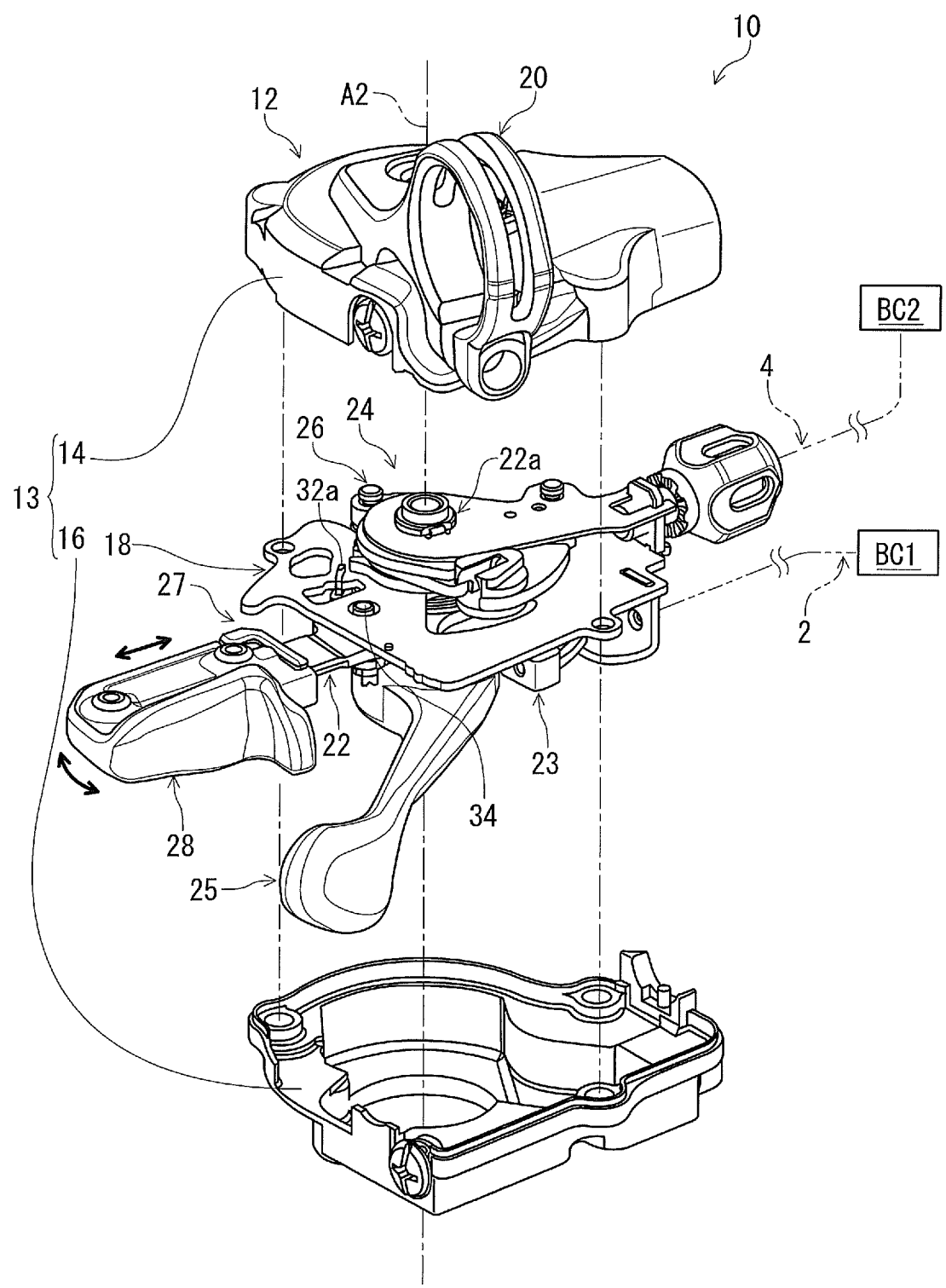
FIG. 3 is an exploded perspective view of the bicycle operating device illustrated in FIG. 1.

As seen in FIG. 1, the bicycle operating device 10 comprises a base member 12. The base member 12 is configured to be mounted to the bicycle part BP. In the illustrated embodiment, as seen in FIG. 3, the base member 12 includes a housing 13. The housing 13 includes a first housing 14 and a second housing 16. The first housing 14 is secured to the second housing 16 using screws (not shown). The base member 12 further includes a base plate 18 secured to the first housing 14 and the second housing 16. The base plate 18 is provided between the first housing 14 and the second housing 16.

As seen in FIG. 1, the bicycle operating device 10 further comprises a mounting member 20 configured to detachably couple the base member 12 to the bicycle part BP. In the illustrated embodiment, the mounting member 20 has a clamping structure configured to clamp the bicycle part BP. The mounting member 20 is secured to the base member 12. The mounting member 20 can be integrally provided with the base member 12 (e.g., the first housing 14 illustrated in FIG. 3) as a single unitary member.

As seen in FIG. 3, the bicycle operating device 10 comprises an operating member 22 and an operating structure 23. The operating member 22 is movable relative to the base member 12. The operating structure 23 is configured to operate the first bicycle component BC1 in response to movement of the operating member 22. The operating structure 23 is configured to operate the first bicycle component BC1 by moving the first operation cable 2 relative to the base member 12 in response to movement of the operating member 22.

In the illustrated embodiment, the operating member 22 is movably mounted to the base plate 18. The operating member 22 is rotatably supported by a support shaft 22a secured to the base member 12. The operating member 22 at least partially protrudes from the base member 12. The operating structure 23 is provided between the first housing 14 and the second housing 16.

As seen in FIG. 3, the bicycle operating device 10 comprises an operating unit 24 configured to operate the second bicycle component BC2 in response to an input operation from a user. The operating unit 24 includes an additional operating member 25 and an additional operating structure 26. The additional operating member 25 is movable relative to the base member 12. In the illustrated embodiment, the additional operating member 25 is pivotable relative to the base member 12 about a pivot axis A2. The additional operating structure 26 is configured to operate the second bicycle component BC2 in response to a movement of the additional operating member 25. The additional operating structure 26 is configured to move the second operation cable 4 to operate the second bicycle component BC2 in response to the movement of the additional operating member 25. The additional operating structure 26 is configured to operate the second bicycle component BC2 via the second operation cable 4 in response to pivotal movement of the additional operating member 25. The operating structure 23 and the operating unit 24 are provided in the housing 13.

As seen in FIG. 3, the bicycle operating device 10 comprises a changing structure 27. The changing structure 27 includes a movable member 28 configured to be movable relative to the operating member 22. The changing structure 27 is configured to change an amount of movement of the operating member 22 relative to the base member 12 in accordance with movement of the movable member 28 relative to the operating member 22. In the illustrated embodiment, the movable member 28 is mounted to the operating member 22. Possible examples of movement of the movable member 28 with respect to the operating member 22 include relative linear movement, relative rotation, and relative pivotal movement.

Figure 4:
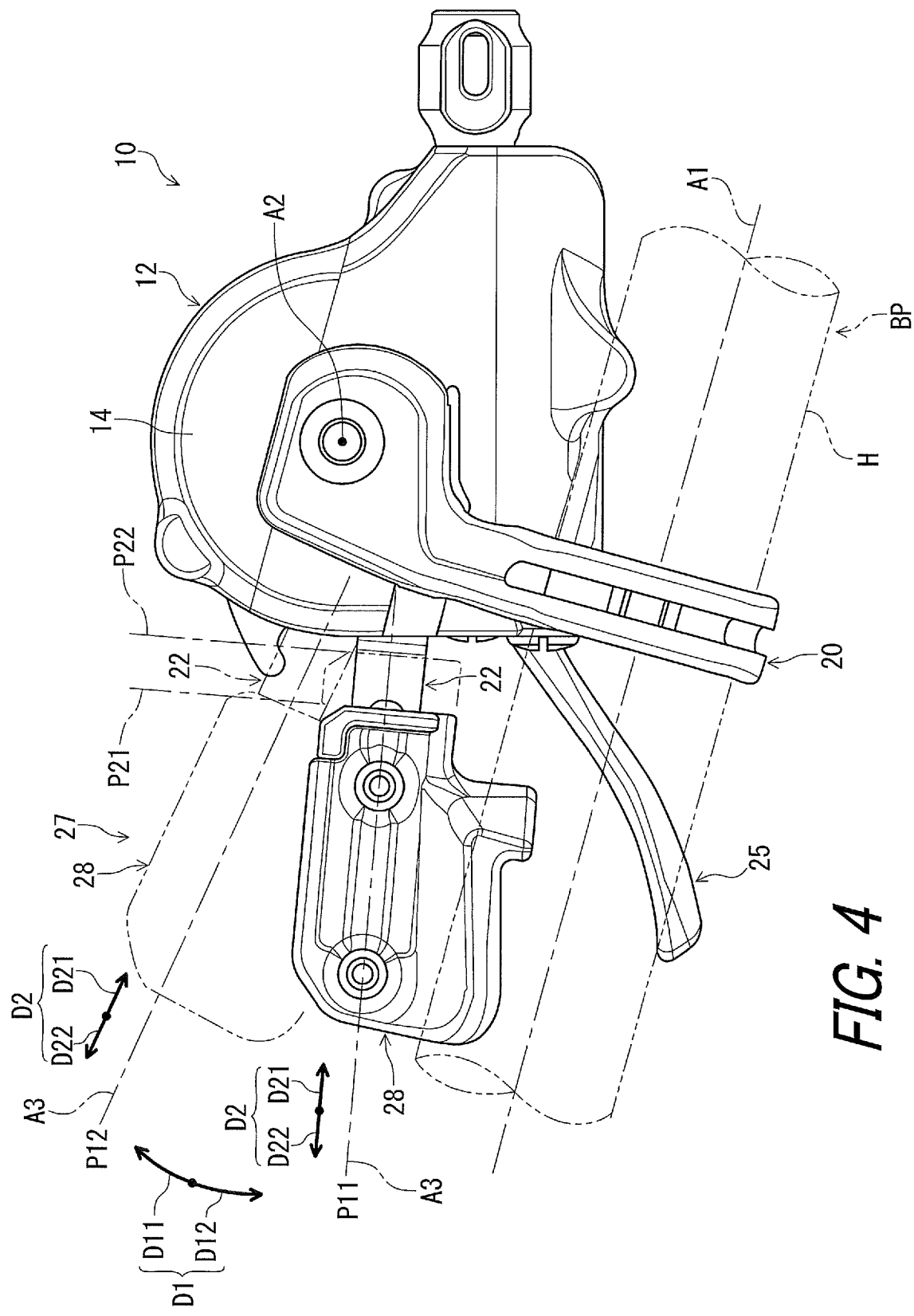
FIG. 4 is a plan view of the bicycle operating device illustrated in FIG. 1.

As seen in FIG. 4, the operating member 22 is movable relative to the base member 12 in a first direction D1. In the illustrated embodiment, the operating member 22 is pivotably mounted to the base member 12 in the first direction D1 about the pivot axis A2. The first direction D1 includes a first operating direction D11 and a first return direction D12 opposite to the first operating direction D11. The pivot axis A2 extends in a direction perpendicular to the longitudinal axis A1 in a state where the base member 12 is attached to the bicycle part BP.

The operating member 22 is movable relative to the base member 12 between a rest position P11 and an operated position P12. More specifically, the operating member 22 is pivotable relative to the base member 12 about the pivot axis A2 between the rest position P11 and the operated position P12. The operating member 22 extends along the longitudinal axis A1 of the bicycle part BP in a state where the operating member 22 is positioned at the rest position P11 and in a state where the base member 12 is mounted to the bicycle part BP via the mounting member 20.

The operating member 22 has a longitudinal axis A3 radially outwardly extending with respect to the pivot axis A2. In the illustrated embodiment, the longitudinal axis A3 of the operating member 22 is inclined with respect to the longitudinal axis A1 of the bicycle part BP in a state where the operating member 22 is positioned at the rest position P11 and in a state where the base member 12 is mounted to the bicycle part BP via the mounting member 20. The longitudinal axis A3 of the operating member 22 can, however, be parallel to the longitudinal axis A1 of the bicycle part BP in a state where the operating member 22 is positioned at the rest position P11 and in a state where the base member 12 is mounted to the bicycle part BP via the mounting member 20. The rest position P11 and the operated position P12 are defined based on the longitudinal axis A3 of the operating member 22.

In the present application, the term "rest position" as used herein refers to a position at which a movable part such as the operating member 22 remains stationary in a state where the movable part is not operated by the user. The term "operated position" as used herein refers to a position at which the movable part has been operated by the user to perform the operation of a bicycle component such as the first bicycle component BC1 and the second bicycle component BC2.

As seen in FIG. 4, the movable member 28 is movable between a first position P21 and a second position P22. The first position P21 is farther from the base member 12 than the second position P22. In the illustrated embodiment, the movable member 28 is slidable relative to the operating member 22. The movable member 28 is slidable relative to the operating member 22 between the first position P21 and the second position P22.

The movable member 28 is movable relative to the operating member 22 in a second direction D2 different from the first direction D1. The movable member 28 is also movable relative to the base member 12 in the first direction D1 together with the operating member 22. The movable member 28 is movable relative to the operating member 22 along the longitudinal axis A3 of the operating member 22. The second direction D2 is defined parallel to the longitudinal axis A3 of the operating member 22. The second direction D2 includes a second operating direction D21 and a second return direction D22 opposite to the second operating direction D21. The movable member 28 is movable relative to the operating member 22 in the second operating direction D21 and the second return direction D22.

Figure 5:
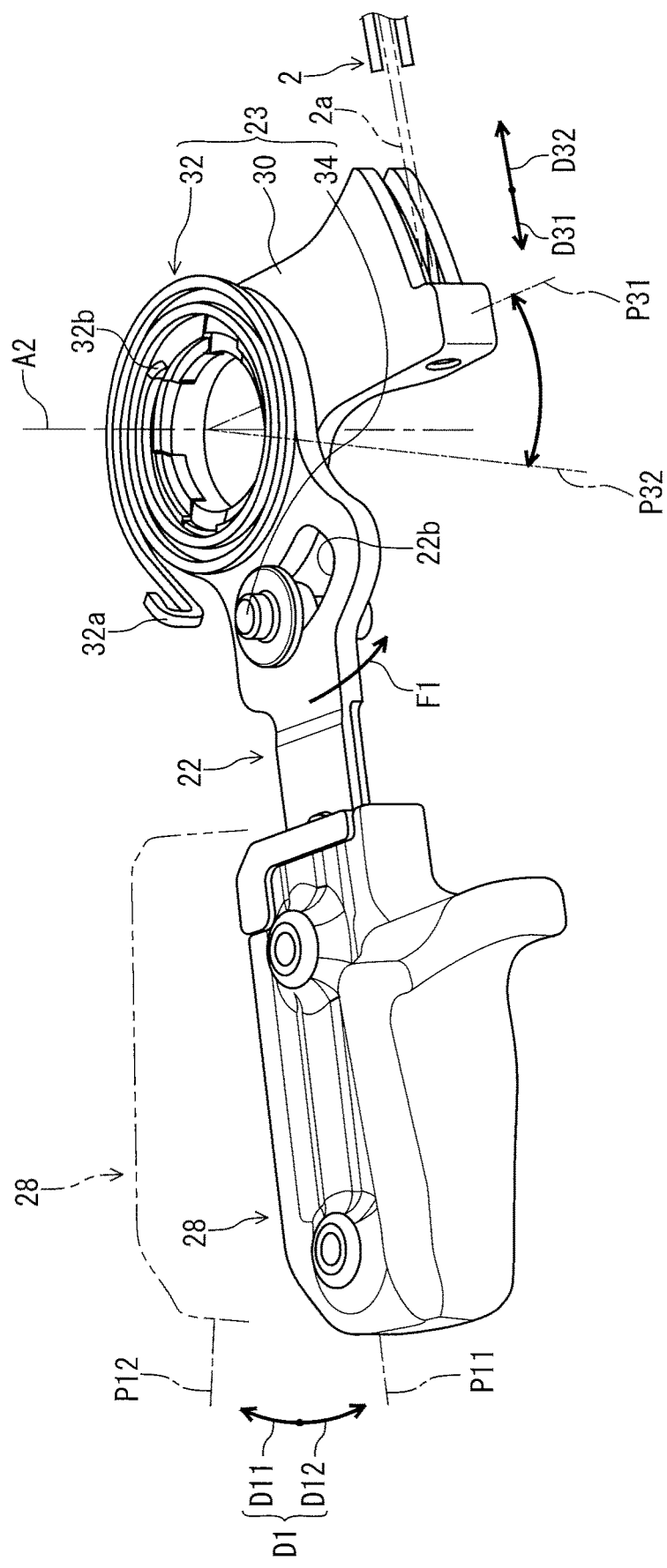
FIG. 5 is a perspective view of a part of the bicycle operating device illustrated in FIG. 1.

As seen in FIG. 5, the operating structure 23 includes a take-up member 30 and a biasing member 32. In the illustrated embodiment, the take-up member 30 is rotatable relative to the base member 12 about the pivot axis A2 to pull and release the first operation cable 2. The take-up member 30 is attached to the operating member 22 and is integrally rotatable with the operating member 22 about the pivot axis A2. An end of the first operation cable 2 is attached to the take-up member 30. More specifically, an end of an inner wire 2a of the first operation cable 2 is attached to the take-up member 30. In the illustrated embodiment, the take-up member 30 is a separate member from the operating member 22. The take-up member 30 can, however, be integrally provided with the operating member 22 as a single unitary member.

The take-up member 30 is movable relative to the base member 12 (FIG. 3) to move the first operation cable 2 in a pulling direction D31 and a releasing direction D32 opposite to the pulling direction D31. The take-up member 30 is configured to move the first operation cable 2 in the pulling direction D31 to operate the first bicycle component BC1 (FIG. 3) in response to a movement of the operating member 22 from the rest position P11 to the operated position P12. The take-up member 30 is configured such that the first operation cable 2 is movable in the releasing direction D32 in response to a release of the operating member 22 from the operated position P12. The operating structure 23 does not include a positioning structure configured to position the take-up member 30 relative to the base member 12 in a state where the operating force is not applied from the rider's finger(s) to the operating member.

In the present application, possible examples of the phrase "release of the operating member" as used herein include moving the rider's finger(s) away from an operating member such as the operating member 22, and removing, from the operating member, an operating force applied from the rider's finger(s) to the operating member.

The biasing member 32 is configured to bias the operating member 22 in the first return direction D12. In other words, the biasing member 32 is configured to bias the operating member 22 such that the operating member 22 is positioned to the rest position P11. More specifically, the biasing member 32 is configured to bias the operating member 22 to pivot relative to the base member 12 (FIG. 4) about the pivot axis A2. The biasing member 32 is configured to bias the take-up member 30 to move the first operation cable 2 in the releasing direction D32 in response to the release of the operating member 22 from the operated position P12. In the illustrated embodiment, the biasing member 32 is a torsion coil spring provided around the pivot axis A2. The biasing member 32 can, however, be other springs such as a compression spring and a tension spring.

The take-up member 30 is movable relative to the base member 12 from a release position P31 to a pulling position P32 in response to the movement of the operating member 22 from the rest position P11 to the operated position P12. The biasing member 32 is configured to bias the take-up member 30 from the pulling position P32 toward the release position P31 to move the first operation cable 2 in the releasing direction D32 in response to the release of the operating member 22 from the operated position P12.

The biasing member 32 includes a first end 32a and a second end 32b. The first end 32a of the biasing member 32 engages with the base plate 18 of the base member 12 (FIG. 3). The second end 32b of the biasing member 32 engages with the operating member 22. The biasing member 32 is configured to apply a biasing force F1 to the operating member 22 in the first return direction D12.

As seen in FIG. 5, when the operating member 22 is pivoted about the pivot axis A2 in the first operating direction D11, the first operation cable 2 is pulled via the take-up member 30 in the pulling direction D31. When the operating member 22 is returned about the pivot axis A2 in the first return direction D12, the first operation cable 2 is released via the take-up member 30 in the releasing direction D32 opposite to the pulling direction D31.

The operating structure 23 further includes a restricting member 34 configured to restrict pivot movement of the operating member 22 between the rest position P11 and the operated position P12. The restricting member 34 is attached to the base plate 18 of the base member 12 (FIG. 3). The operating member 22 includes an elongated opening 22b extending in the first direction D1. The restricting member 34 extends through the elongated opening 22b. The operating member 22 is positioned at the rest position P11 by the biasing member 32 and the restricting member 34. The operating member 22 is pivotable relative to the base member 12 within a movable range defined by the elongated opening 22b and the restricting member 34 against the biasing force F1 of the biasing member 32.

Figure 6:
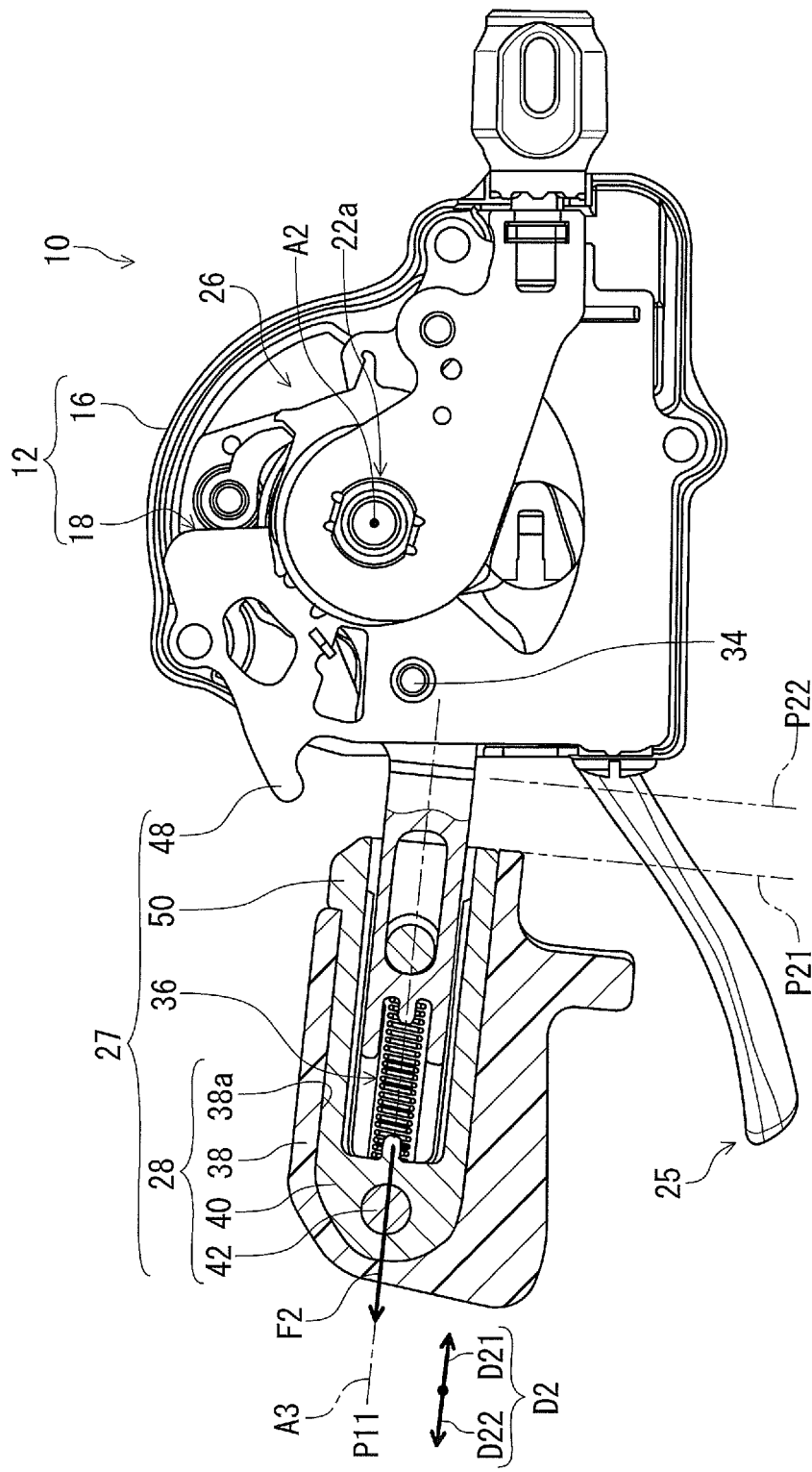
FIG. 6 is a cross-sectional view of the bicycle operating device illustrated in FIG. 1.

As seen in FIG. 6, the changing structure 27 further includes a biasing element 36 configured to bias the movable member 28 to the first position P21 relative to the operating member 22. The biasing element 36 is configured to radially outwardly bias the movable member 28 relative to the operating member 22. More specifically, the biasing element 36 is configured to bias the movable member 28 toward an opposite side of the pivot axis A2 relative to the operating member 22. The biasing element 36 is configured to bias the movable member 28 in the second return direction D22. The biasing element 36 is configured to apply a biasing force F2 to the movable member 28 along the longitudinal axis A3 of the operating member 22.

The biasing element 36 is configured to bias the movable member 28 toward the first handlebar end H1 (FIG. 2) of the bicycle handlebar H relative to the operating member 22 in a state where the base member 12 is mounted to the bicycle handlebar H via the mounting member 20 at a position closer to the first handlebar end H1 than to the second handlebar end H2 (FIG. 2).

As seen in FIG. 6, the movable member 28 includes a cover part 38, an insertion part 40, and a fastener 42. The cover part 38 has an internal cavity 38a. The insertion part 40 extends along the longitudinal axis A3 of the operating member 22 and is provided in the internal cavity 38a. The biasing element 36 is provided in the internal cavity 38a.

Figure 7:
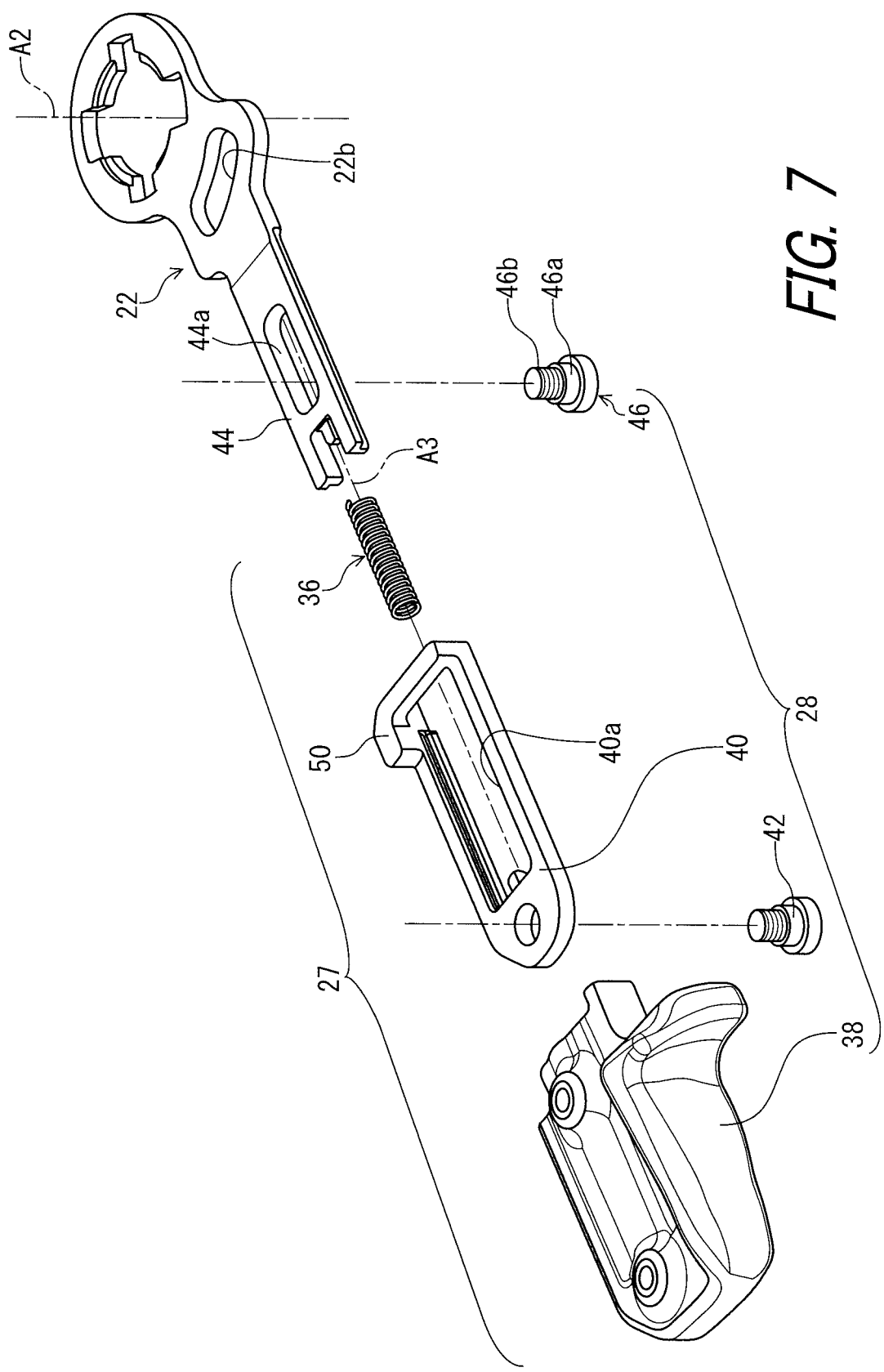
FIG. 7 is an exploded perspective view of a changing structure of the bicycle operating device illustrated in FIG. 1.

As seen in FIG. 7, the cover part 38 is fastened to the insertion part 40 by the fastener 42 (e.g., a screw). The insertion part 40 is slidable with the operating member 22 along the longitudinal axis A3 of the operating member 22. More specifically, the operating member 22 includes a guide portion 44 extending along the longitudinal axis A3 of the operating member 22. It can be said that the longitudinal axis A3 of the operating member 22 is defined by the guide portion 44. The insertion part 40 includes a slide opening 40a extending along the longitudinal axis A3 of the operating member 22. The guide portion 44 is slidably provided in the slide opening 40a to guide the movable member 28 along the longitudinal axis A3 of the operating member 22.

The operating member 22 includes one of a contact part and an elongated hole. The movable member 28 includes another of the contact part and the elongated hole. In the illustrated embodiment, the operating member 22 includes an elongated hole 44a, and the movable member 28 includes a contact part 46. The elongated hole 44a is provided on the guide portion 44 of the operating member 22. The elongated hole 44a extends along the longitudinal axis A3 of the operating member 22. The contact part 46 is provided in the elongated hole 44a so as to restrict relative movement between the operating member 22 and the movable member 28. The contact part 46 includes a contact body 46a and an externally threaded part 46b. The contact body 46a is movably provided in the elongated hole 44a. The externally threaded part 46b is screwed in a threaded hole (not shown) of the cover part 38.

As seen in FIG. 6, the changing structure 27 further includes a first contact portion 48 and a second contact portion 50. The first contact portion 48 is provided on the base member 12. The first contact portion 48 can, however, be provided on the operating member 22. In the illustrated embodiment, the first contact portion 48 is integrally provided with the base plate 18 of the base member 12 as a single unitary member. The first contact portion 48 protrudes from the base member 12 to be contactable with the second contact portion 50. The second contact portion 50 is provided on one of the operating member 22 and the movable member 28. In the illustrated embodiment, the second contact portion 50 is provided on the movable member 28. The second contact portion 50 is contactable with the first contact portion 48 to restrict an amount of movement of the operating member 22 relative to the base member 12 when the movable member 28 is positioned at the second position P22.

As seen in FIGS. 6 and 7, the second contact portion 50 is provided on the insertion part 40 of the movable member 28. The second contact portion 50 is provided outside the cover part 38. In the illustrated embodiment, the cover part 38 is made of a non-metallic material such as a resin material. Each of the first contact portion 48 and the second contact portion 50 is made of a metallic material. However, at least one of the first contact portion 48 and the second contact portion 50 can be made of a non-metallic material.

Figure 8:
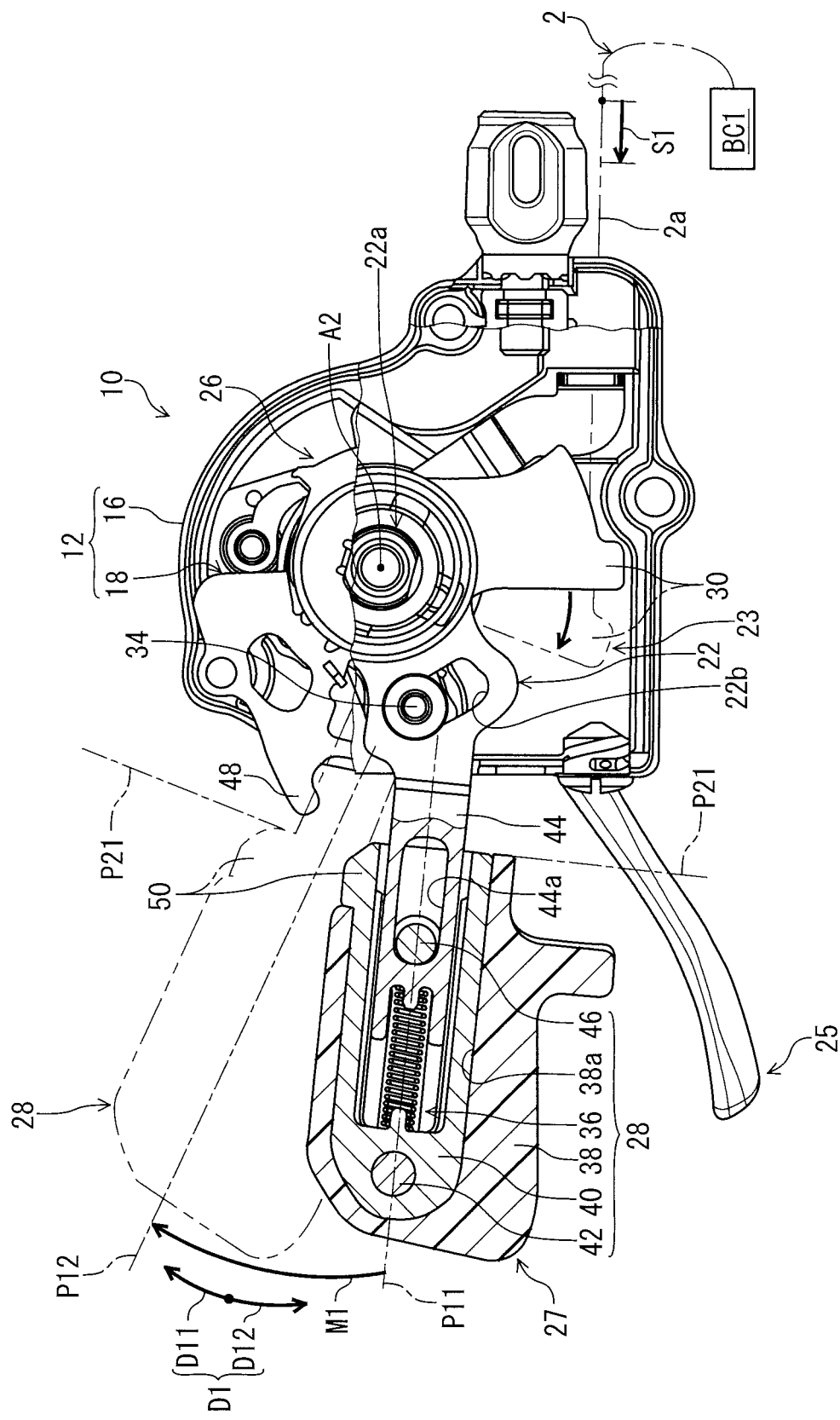
FIG. 8 is a cross-sectional view of the bicycle operating device illustrated in FIG. 1.

As seen in FIG. 8, the first position P21 corresponds to a first amount of movement M1 of the operating member 22 relative to the base member 12. The first amount of movement M1 of the operating member 22 is defined between the rest position P11 and the operated position P12. In a state where the movable member 28 is positioned at the first position P21 relative to the operating member 22, the second contact portion 50 is not contactable with the first contact portion 48. This allows the operating member 22 to be pivoted relative to the base member 12 about the pivot axis A2 within the first amount of movement M1.

Figure 9:
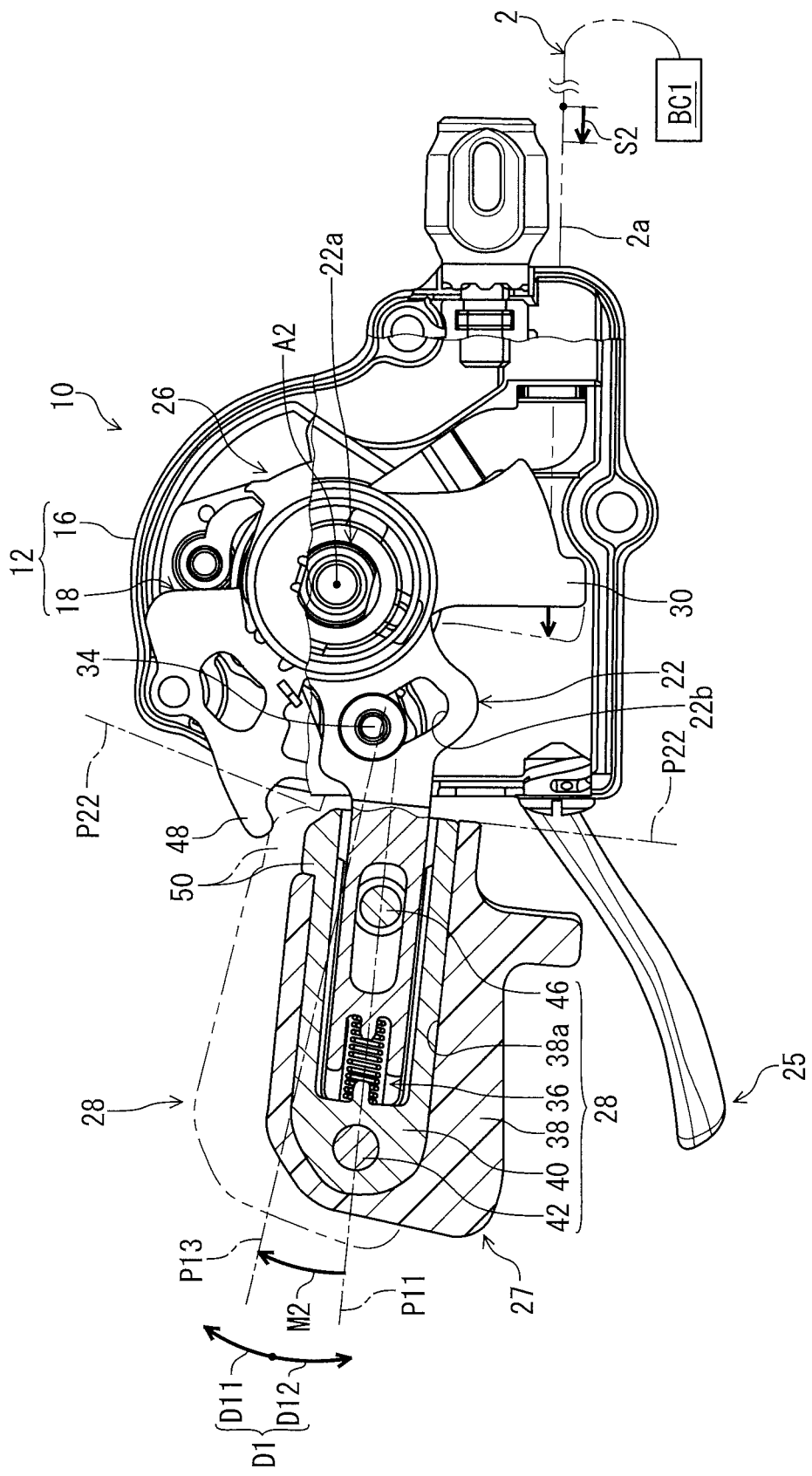
FIG. 9 is a cross-sectional view of the bicycle operating device illustrated in FIG. 1.

As seen in FIG. 9, the second position P22 corresponds to a second amount of movement M2 of the operating member 22 relative to the base member 12. The second amount of movement M2 of the operating member 22 is defined between the rest position P11 and an additional operated position P13. In a state where the movable member 28 is positioned at the second position P22 relative to the operating member 22, the second contact portion 50 is contactable with the first contact portion 48. In other words, the movable member 28 positioned at the second position P22 is movable in the first operating direction D11 until the second contact portion 50 contacts the first contact portion 48. This allows the operating member 22 to be pivoted relative to the base member 12 about the pivot axis A2 within the second amount of movement M2.

As seen in FIGS. 8 and 9, the second amount of movement M2 is different from the first amount of movement M1. The first amount of movement M1 of the operating member 22 is greater than the second amount of movement M2 of the operating member 22. The bicycle operating device 10 differently operates the first bicycle component BC1 when the operating member 22 moves by the second amount of movement M2 in comparison with when the operating member 22 moves by the first amount of movement M1.

For example, in a case where the first bicycle component BC1 is a derailleur, the bicycle operating device 10 operates the derailleur so that a shift position of when the operating member 22 moves by the second amount of movement M2 is different from a shift position of when the operating member 22 moves by the first amount of movement M1. In a case where the first bicycle component BC1 is a height adjustable seatpost assembly, the bicycle operating device 10 operates the height adjustable seatpost assembly so that height of when the operating member 22 moves by the second amount of movement M2 is different from height of when the operating member 22 moves by the first amount of movement M1.

More specifically, as seen in FIG. 8, the operating structure 23 is configured to pull the first operation cable 2 by a first amount of cable stroke S1 in a state where the operating member 22 is moved relative to the base member 12 by the first amount of movement M1. As seen in FIG. 9, the operating structure 23 is configured to pull the first operation cable 2 by a second amount of cable stroke S2 in a state where the operating member 22 is moved relative to the base member 12 by the second amount of movement M2. As seen in FIGS. 8 and 9, the first amount of cable stroke S1 is different from the second amount of cable stroke S2. The first amount of cable stroke S1 is greater than the second amount of cable stroke S2.

As described above, changing an amount of movement of the operating member 22 by the changing structure 27 results in differently operating the first bicycle component BC1 in comparison with a state before changing the amount of movement of the operating member 22 by the changing structure 27.

Figure 10:
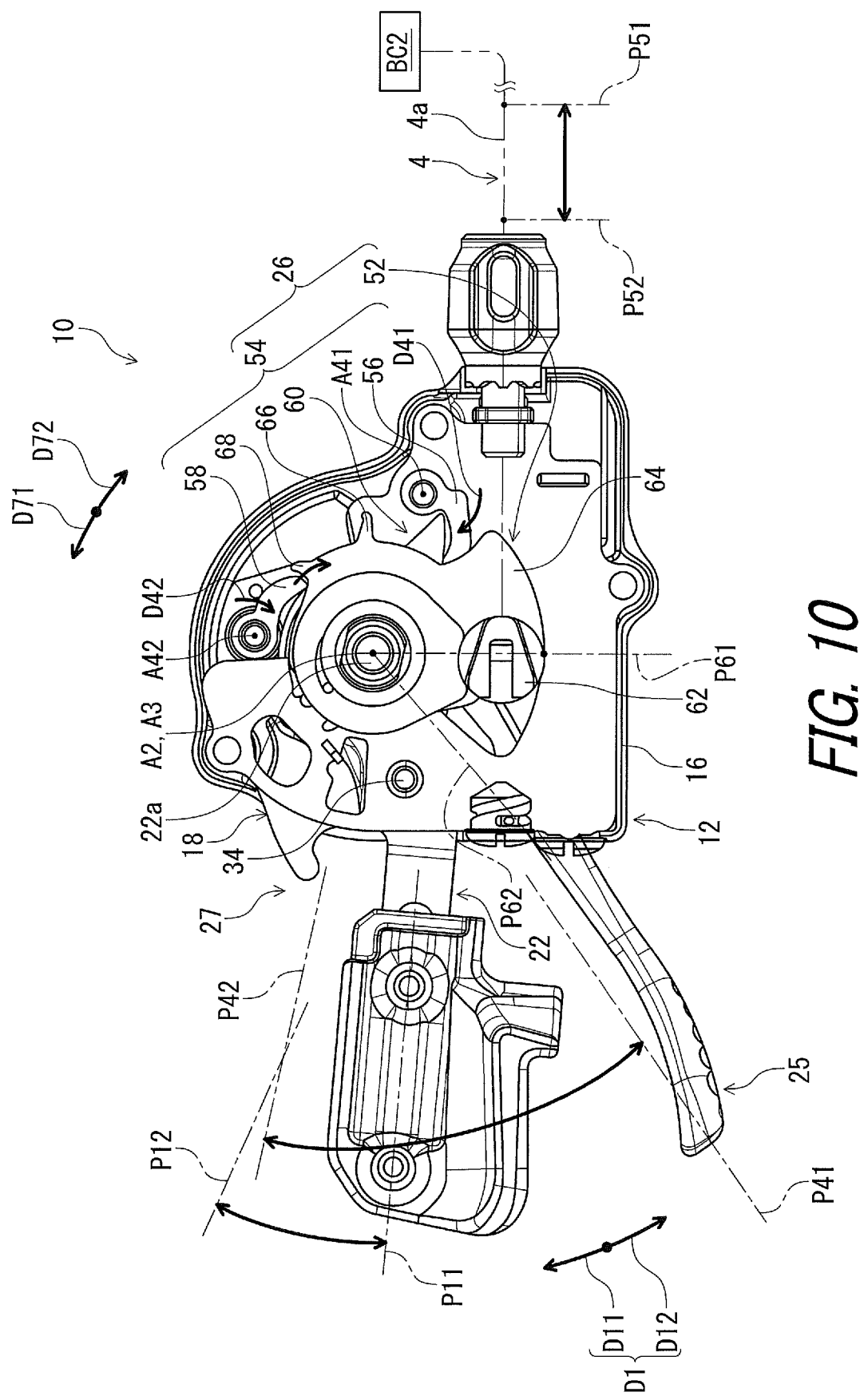
FIG. 10 is a cross-sectional view of the bicycle operating device illustrated in FIG. 1.

As seen in FIG. 10, the additional operating member 25 is movable relative to the base member 12 between an additional rest position P41 and an additional operated position P42. The additional operating structure 26 is configured to position the second operation cable 4 relative to the base member 12 at a first position P51 in a rest state where the additional operating member 25 is disposed at the additional rest position P41. More specifically, the additional operating structure 26 is configured to position the second operation cable 4 relative to the base member 12 at each of the first position P51 and a second position P52 in the rest state of the additional operating member 25.

Figure 11:
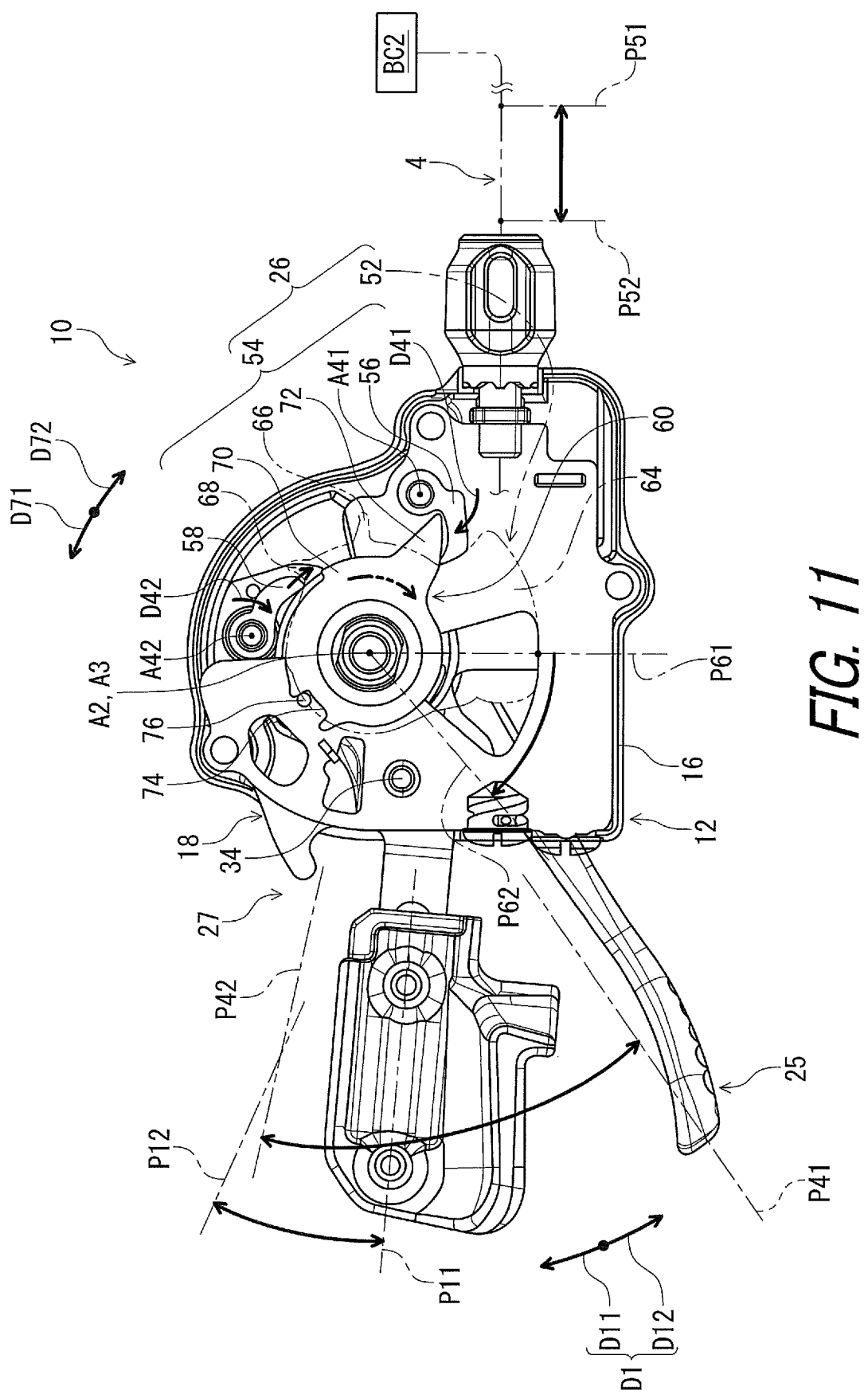
FIG. 11 is a cross-sectional view of the bicycle operating device illustrated in FIG. 1.
Figure 12:
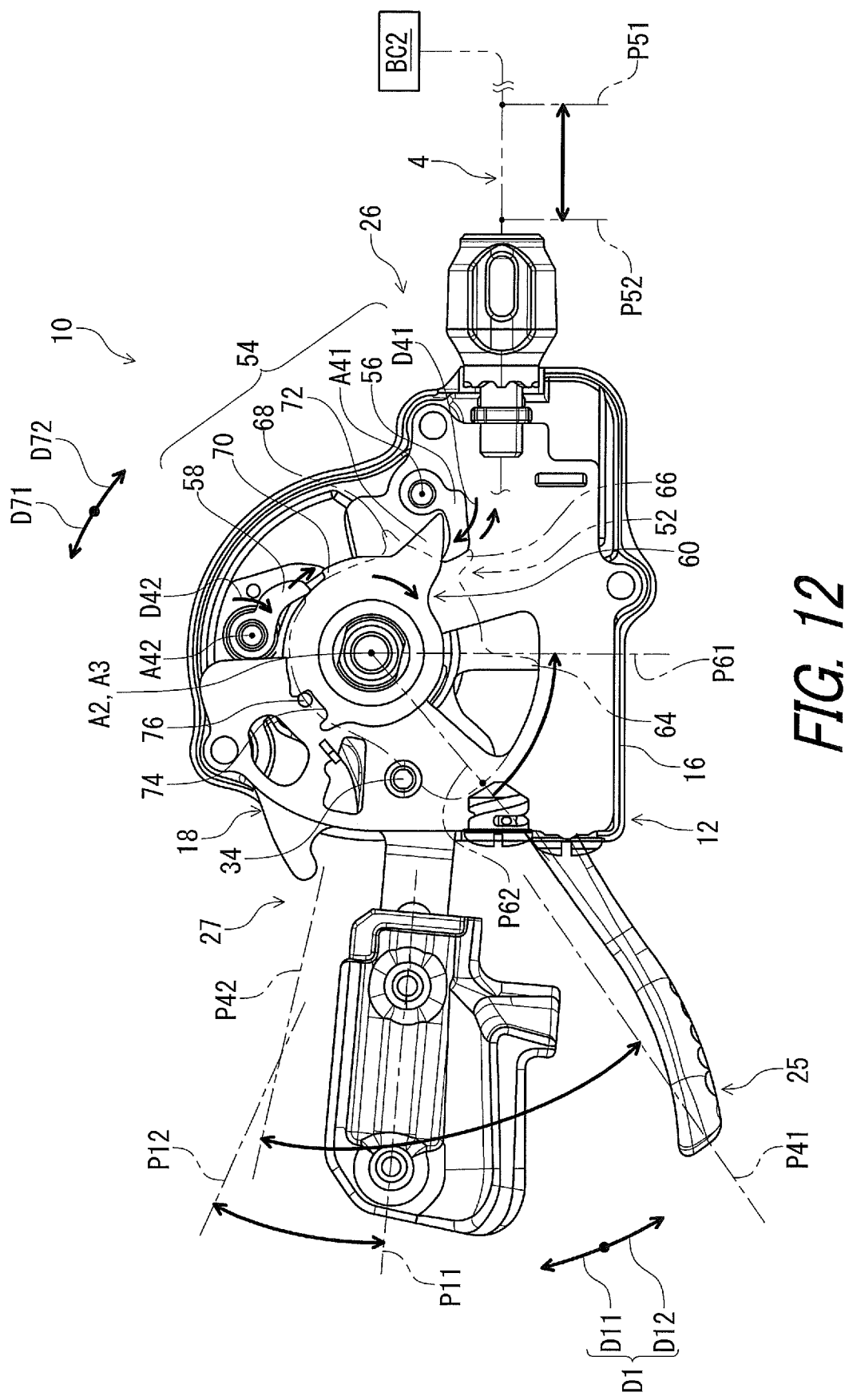
FIG. 12 is a cross-sectional view of the bicycle operating device illustrated in FIG. 1.

As seen in FIG. 10, the additional operating structure 26 includes an additional take-up member 52 and a positioning structure 54. The additional take-up member 52 is movable relative to the base member 12 between an additional release position P61 and an additional pulling position P62 to move the second operation cable 4 between the first position P51 and the second position P52. In the illustrated embodiment, the additional take-up member 52 is rotatable relative to the base member 12 about the pivot axis A2. In FIGS. 11 and 12, the additional take-up member 52 is illustrated with a two-dot chain line.

The positioning structure 54 is configured to position the additional take-up member 52 relative to the base member 12 at the additional release position P61 and the additional pulling position P62. The positioning structure 54 is configured to switch a state of the positioning structure 54 between a first state (FIGS. 10 and 11) and a second state (FIG. 12) in response to a movement of the additional operating member 25. In the first state (FIGS. 10 and 11), the positioning structure 54 positions the additional take-up member 52 at the additional release position P61. In the second state (FIG. 12), the positioning structure 54 positions the additional take-up member 52 at the additional pulling position P62. In the illustrated embodiment, the positioning structure 54 is configured to alternately switch the first state and the second state in response to a movement of the additional operating member 25 from the additional rest position P41 to the additional operated position P42.

As seen in FIG. 10, the operating member 22 is movable relative to the base member 12 from the rest position P11 to the operated position P12 in the first operating direction D11. The additional operating member 25 is movable relative to the base member 12 from the additional rest position P41 to the additional operated position P42 in the first operating direction D11.

The positioning structure 54 includes a positioning pawl 56, a winding pawl 58, and a control member 60. The control member 60 is rotatable relative to the base plate 18 and the additional take-up member 52 about the pivot axis A2. The control member 60 is biased by a biasing element (not shown) to rotate relative to the base plate 18 in a first rotational direction D71.

As seen in FIG. 10, the additional take-up member 52 includes an additional cable attachment portion 62 to which an inner wire 4a of the second operation cable 4 is to be attached. The additional take-up member 52 includes a first protrusion 64, a second protrusion 66, and a third protrusion 68. The first protrusion 64, the second protrusion 66, and the third protrusion 68 are spaced apart from each other.

The positioning pawl 56 is configured to selectively engage with the first protrusion 64 and the second protrusion 66 to position the additional take-up member 52 at the additional release position P61 and the additional pulling position P62. The winding pawl 58 is contactable with the third protrusion 68 to transmit a pivotal movement of the additional operating member 25 to the additional take-up member 52 via the third protrusion 68. The positioning pawl 56 is pivotably mounted on the base plate 18 of the base member 12 about a pivot axis A41. The positioning pawl 56 is biased by a biasing element (not shown) to pivot relative to the base plate 18 about the pivot axis A41 in a pivotal direction D41. The winding pawl 58 is pivotably mounted on the additional operating member 25 about a pivot axis A42. The winding pawl 58 is biased by a biasing element (not shown) to pivot relative to the additional operating member 25 about the pivot axis A42 in a pivotal direction D42. The winding pawl 58 is movable relative to the base member 12 in response to the pivotal movement of the additional operating member 25.

As seen in FIG. 11, the control member 60 includes a receiving portion 70, a release pawl 72, and a cutout 74. The winding pawl 58 is contactable with the receiving portion 70 to transmit the pivotal movement of the additional operating member 25 to the control member 60 via the receiving portion 70. The release pawl 72 is contactable with the positioning pawl 56 to release the engagement between the positioning pawl 56 and the second protrusion 66. The base member 12 includes a pin 76 secured to the base plate 18. The pin 76 is provided in the cutout 74 to define a rotational range of the control member 60. The control member 60 is positioned by the pin 76 at a rest position shown in FIG. 11.

As seen in FIG. 11, the winding pawl 58 moves in a second rotational direction D72 opposite to the first rotational direction D71 in response to the pivotal movement of the additional operating member 25 from the additional rest position P41 toward the additional operated position P42. When the winding pawl 58 moves in the second rotational direction D72 in a state where the additional take-up member 52 is positioned at the additional release position P61, the winding pawl 58 presses the third protrusion 68 so that the additional take-up member 52 rotates relative to the base member 12 about the pivot axis A2 from the additional release position P61 toward the additional pulling position P62.

The winding pawl 58 is disposed radially outward of the receiving portion 70 of the control member 60 in a state where the winding pawl 58 engages with the third protrusion 68. Thus, the winding pawl 58 presses the third protrusion 68 in the second rotational direction D72 without contacting the receiving portion 70.

The rotation of the additional take-up member 52 brings the second protrusion 66 into contact with the positioning pawl 56. Further rotation of the additional take-up member 52 moves the positioning pawl 56 away from the additional take-up member 52 via the second protrusion 66. When the additional operating member 25 is pivoted to the additional operated position P42, the second protrusion 66 passes through the positioning pawl 56 in the second rotational direction D72. When the additional operating member 25 is released by the user from the additional operated position P42, the additional take-up member 52 is rotated relative to the base plate 18 about the pivot axis A2 in the first rotational direction D71 by the biasing force of the biasing element (not shown). Thus, as seen in FIG. 12, the positioning pawl 56 engages with the second protrusion 66 to position the additional take-up member 52 at the additional pulling position P62.

As seen in FIG. 12, the winding pawl 58 moves relative to the base member 12 in the second rotational direction D72 in response to the pivotal movement of the additional operating member 25 from the additional rest position P41 toward the additional operated position P42. In a state where the additional take-up member 52 is positioned at the additional pulling position P62, an end of the winding pawl 58 is contactable with the receiving portion 70. Accordingly, the winding pawl 58 presses the receiving portion 70 of the control member 60 so that the control member 60 rotates relative to the base member 12 about the pivot axis A2 in the second rotational direction D72. Since the winding pawl 58 does not contact the third protrusion 68, the additional take-up member 52 is positioned at the additional pulling position P62 without rotating relative to the base plate 18. The additional operating member 25 is pivoted until an edge of the cutout 74 contacts the pin 76.

The rotation of the control member 60 brings the release pawl 72 into contact with the positioning pawl 56. Further rotation of the control member 60 moves the positioning pawl 56 away from the additional take-up member 52 via the release pawl 72 so that the engagement between the positioning pawl 56 and the second protrusion 66 is released. Thus, the additional take-up member 52 is rotated relative to the base plate 18 in the first rotational direction D71 by the biasing force of the biasing element (not shown). At this time, the first protrusion 64 contacts the positioning pawl 56 to position the additional take-up member 52 at the additional release position P61 since the first protrusion 64 protrudes radially more outward than the second protrusion 66.

The control member 60 is rotated relative to the base plate 18 about the pivot axis A2 in the first rotational direction D71 by the biasing force of the biasing element (not shown) since the additional take-up member 52 disengage the winding pawl 58 from the receiving portion 70 of the control member 60 when the additional take-up member 52 rotates relative to the base plate 18 in the first rotational direction D71 by the biasing force of the biasing element (not shown). Thus, the positioning pawl 56 engages with the first protrusion 64 to position the additional take-up member 52 at the additional release position P61. Accordingly, it is possible to switch a position of the inner wire 4a of the second operation cable 4 between the first and second positions P51 and P52 corresponding to the additional release position P61 and the additional pulling position P62 by only operating the additional operating member 25 from the additional rest position P41 to the additional operated position P42.

With the bicycle operating device 10, the operating structure 23 includes the take-up member 30 movable relative to the base member 12 to move the first operation cable 2 in the pulling direction D31 and the releasing direction D32 opposite to the pulling direction D31. The take-up member 30 is configured to move the first operation cable 2 in the pulling direction D31 to operate the first bicycle component BC1 in response to the movement of the operating member 22 from the rest position P11 to the operated position P12. The take-up member 30 is configured such that the first operation cable 2 is movable in the releasing direction D32 in response to the release of the operating member 22 from the operated position P12. Accordingly, the first operation cable 2 can be moved in the pulling direction D31 and the releasing direction D32 for operating the first bicycle component BC1 in response to the movement and the release of the operating member 22, respectively.

Furthermore, since the operating unit 24 is configured to operate the second bicycle component BC2 in response to the input operation from the user, it is possible to separately operate the first and second bicycle components BC1 and BC2 via the bicycle operating device 10.

Second Embodiment

A bicycle operating device 210 in accordance with a second embodiment will be described below referring to FIGS. 13 and 14. Elements having substantially the same function as those in the first embodiment will be numbered the same here, and will not be described and/or illustrated again in detail here for the sake of brevity.

Figure 13:
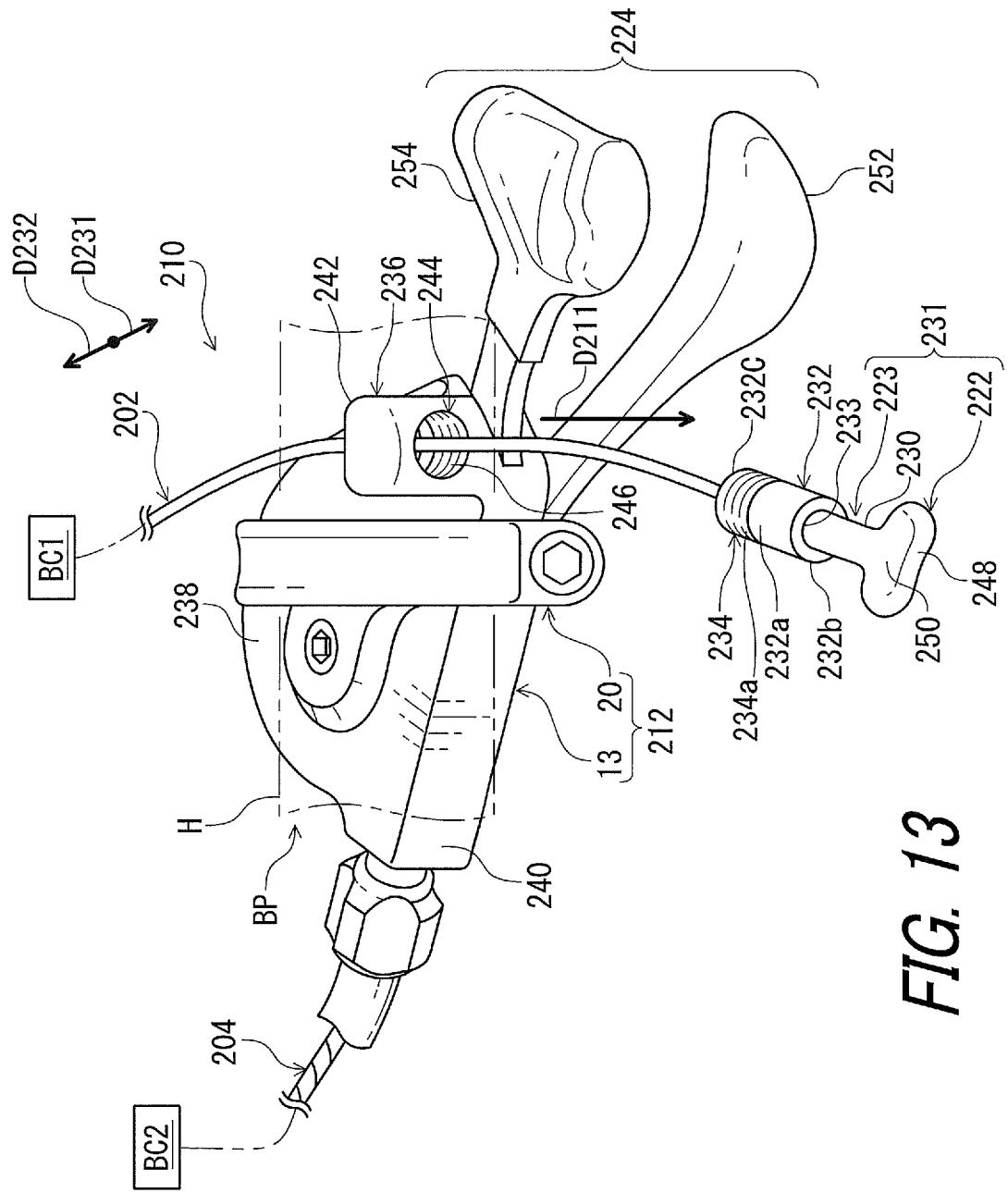
FIG. 13 is an exploded perspective view of a bicycle operating device in accordance with a second embodiment.
Figure 14:
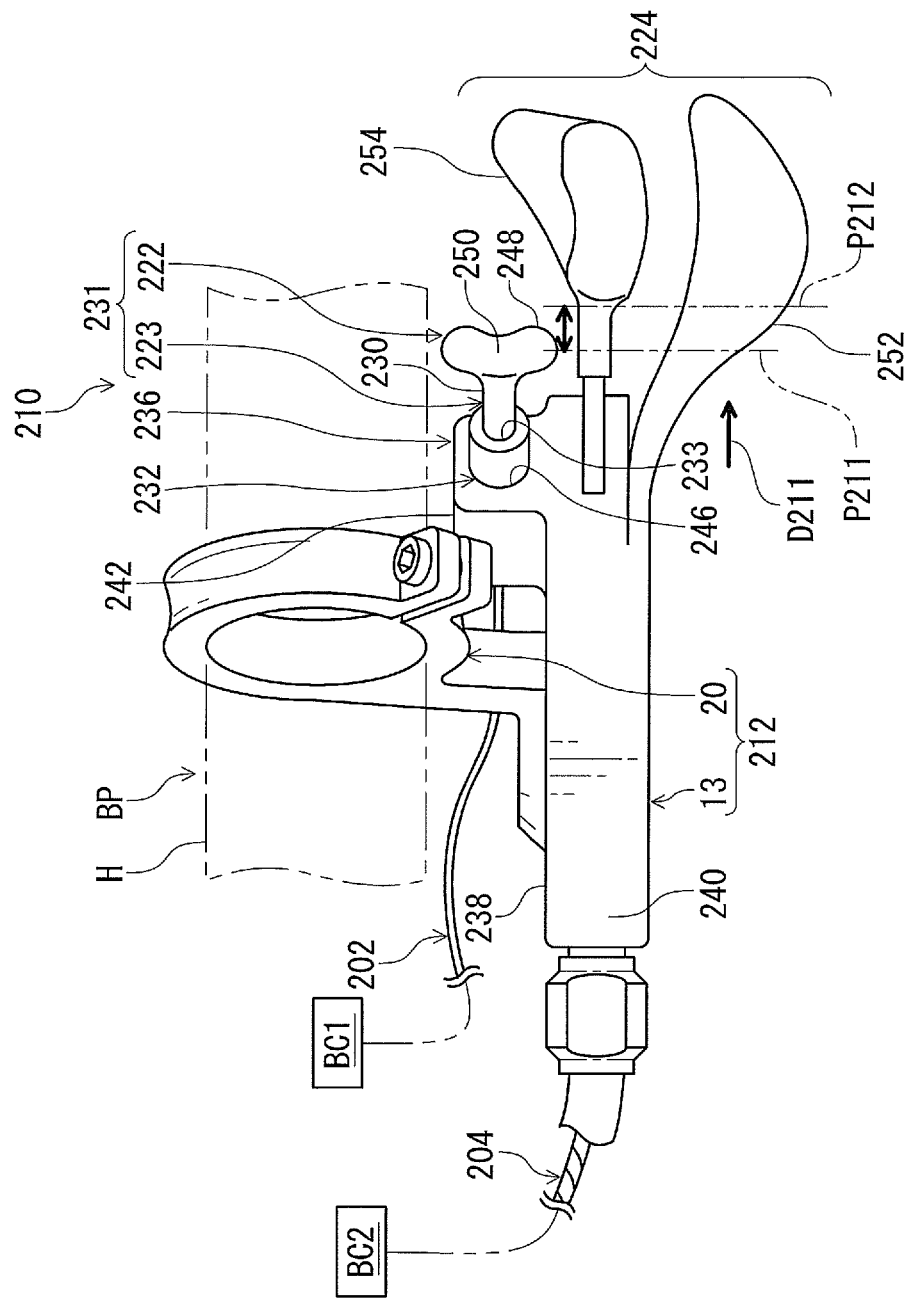
FIG. 14 is a rear view of the bicycle operating device illustrated in FIG. 13.

As seen in FIGS. 13 and 14, the bicycle operating device 210 comprises a base member 212 and an operating member 222. The base member 212 is configured to be mounted to the bicycle part BP. The operating member 222 is movable relative to the base member 212 between a rest position P211 and an operated position P212. The operating member 222 is movable relative to the base member 212 from the rest position P211 to the operated position P212 in a first operating direction D211.

The bicycle operating device 210 is a right bicycle operating device configured to be operated with a rider's right hand. However, it will be apparent to those skilled in the bicycle field from the present disclosure that the configuration of the bicycle operating device 210 can be applied to a left bicycle operating device as well as the bicycle operating device 10.

As seen in FIGS. 13 and 14, the bicycle operating device 210 comprises an operating structure 223. The operating structure 223 includes a take-up member 230 movable relative to the base member 212 to move a first operation cable 202 in a pulling direction D231 and a releasing direction D232 opposite to the pulling direction D231. The take-up member 230 is configured to move the first operation cable 202 in the pulling direction D231 to operate the first bicycle component BC1 in response to a movement of the operating member 222 from the rest position P211 to the operated position P212. The take-up member 230 is configured such that the first operation cable 202 is movable in the releasing direction D232 in response to a release of the operating member 222 from the operated position P212. For example, the first operating cable 202 is pulled by a biasing member (not shown) provided in the first bicycle component BC1. The operating member 222 and the operating structure 223 provide a cable operating unit 231 configured to perform an operation of the first bicycle component BC1. The operating structure 223 does not include a positioning structure configured to position the take-up member 230 relative to the base member 212 in a state where the operating force is not applied from the rider's finger(s) to the operating member.

In the illustrated embodiment, the take-up member 230 is movable together with the operating member 222. The take-up member 230 is secured to the operating member 222. The take-up member 230 is coupled to an end of the first operation cable 202. The take-up member 230 is integrally provided with the operating member 222 as a single unitary member. However, the take-up member 230 can be a separate member from the operating member 222.

In the illustrated embodiment, as seen in FIGS. 13 and 14, the operating member 222 is configured to be detachably attached to the base member 212. The bicycle operating device 210 includes an attachment member 232 configured to be detachably attached to the base member 212. The attachment member 232 movably supports the take-up member 230. The attachment member 232 has a substantially cylindrical shape. The attachment member 232 includes an opening 233. The take-up member 230 is slidably provided in the opening 233 of the attachment member 232. Thus, the take-up member 230 is linearly movable relative to the base member 212.

As seen in FIGS. 13 and 14, the attachment member 232 includes an attachment part 234 configured to be detachably attached to the base member 212. More specifically, the attachment member 232 includes an outer surface 232a, a first end portion 232b, and a second end portion 232c. The first end portion 232b is axially opposite to the second end portion 232c. Preferably, the attachment part 234 is provided at the second end portion 232c. In this embodiment, the attachment part 234 includes an external threaded portion 234a provided on the outer surface 232a.

The base member 212 includes an attachment area 236, a top surface 238, and a rear surface 240. The attachment area 236 is provided on the housing 13 of the base member 212. While the attachment area 236 is provided on the top surface 238 of the base member 212 in the illustrated embodiment, the attachment area 236 can be provided on other surfaces such as the rear surface 240 in the base member 212 if needed and/or desired.

As seen in FIGS. 13 and 14, the base member 212 includes an attachment portion 242 provided on the housing 13 of the base member 212. The attachment portion 242 extends upwardly from the housing 13. In the illustrated embodiment, the attachment portion 242 extends upwardly from the top surface 238 of the base member 212. The attachment portion 242 is provided in the attachment area 236.

The attachment portion 242 includes an attachment opening 244. The attachment opening 244 includes an internal threaded portion 246. The external threaded portion 234a of the attachment member 232 is configured to engage with the internal threaded portion 246 of the attachment opening 244. In the illustrated embodiment, the external threaded portion 234a is provided on a portion of the outer surface 232a of the attachment member 232. However, the external threaded portion 234a can be entirely provided on the outer surface 232a of the attachment member 232 if needed and/or desired.

The operating member 222 has a user interface surface 248. The user interface surface 248 is configured to face a rearward direction in a state where the bicycle operating device 210 is mounted on the bicycle part BP. In this embodiment, the user interface surface 248 of the operating member 222 preferably is on a gripping portion 250 configured to allow a user to grip the operating member 222 for operating the first bicycle component BC1. The take-up member 230 extends from the gripping portion 250. The gripping portion 250 protrudes from or is positioned outside of the attachment member 232. The operating member 222 is movable in a forward direction and a rearward direction in the state where the bicycle operating device 210 is mounted on the bicycle part BP.

As seen in FIGS. 13 and 14, the cable operating unit 231 is configured to perform an operation of the bicycle height adjustable seatpost (not shown). In more detail, the cable operating unit 231 is configured to operate the first operation cable 202 connected to the bicycle height adjustable seatpost. Accordingly, when the take-up member 230 of the cable operating unit 231 is moved relative to the attachment member 232 in the first operating direction D211, the height of the seat (not shown) of the bicycle is changed. The bicycle height adjustable seatpost can be constructed in any conventional manner and is therefore not discussed in detail herein. The first bicycle component BC1 can be a bicycle suspension. In such an embodiment, when the operating member 222 of the cable operating unit 231 is moved relative to the attachment member 232, the stiffness of the bicycle suspension is altered. The bicycle suspension can be constructed in any conventional manner and is therefore not discussed in detail herein. The cable operating unit 231 can have such a construction that the first operation cable 202 is pulled by moving the operating member 222 in a direction (a direction in which the operating member 222 is pushed) opposite to the first operating direction D211 if needed and/or desired.

The attachment part 234 of the cable operating unit 231 is detachably attached to the attachment area 236 of the base member 212. In this embodiment, the cable operating unit 231 is detachably disposed in the attachment opening 244 of the base member 212. That is, the cable operating unit 231 is inserted into the attachment opening 244 of the base member 212. The external threaded portion 234a of the attachment part 234 engages with the internal threaded portion 246 of the attachment opening 244 to secure the cable operating unit 231 in the attachment opening 244. The threaded attachment enables the cable operating unit 231 to be adjusted in a longitudinal direction within the attachment opening 244. Thus, the cable operating unit 231 is detachably and adjustably attached to the attachment area 236 of the base member 212.

As seen in FIGS. 13 and 14, the bicycle operating device 210 comprises an operating unit 224 configured to operate the second bicycle component BC2 in response to an input operation from a user. The operating unit 224 includes an additional operating member 252. The additional operating member 252 is movable relative to the base member 212. The additional operating member 252 performs a cable pulling operation for pulling the second operation cable 204. The additional operating member 252 is configured as a lever so as to pivotally move with respect to the base member 212.

The operating unit 224 is configured to perform an operation of at least one of a bicycle transmission component and a bicycle brake component (not shown both). In one embodiment, the operating unit 224 is configured to perform an operation of the bicycle transmission component. In more detail, the operating unit 224 is configured to operate the second operation cable 204 connected to the bicycle transmission component.

The operating unit 224 includes an additional operating member 254. The additional operating member 254 is movable relative to the base member 212. The additional operating member 254 is configured to perform a cable release operation for releasing the second operation cable 204. The additional operating member 254 is configured as a lever so as to pivotally move with respect to the base member 212.

While the additional operating members 252 and 254 are levers in the illustrated embodiment, the additional operating members 252 and 254 are not limited to such levers. Any kind of operating members, e.g. a slidable switch, button and so on, can be applied to the additional operating members 252 and 254 if needed and/or desired. Further, it is possible to have one operating member perform both operations, thus, two operating members are not necessarily redirection required as well as the bicycle operating device 10 in accordance with the first embodiment.

In the illustrated embodiment, the operating unit 224 includes an additional operating structure (not shown) provided in the housing 13 of the base member 212. The additional operating structure is configured to operate the second bicycle component BC2 in response to a movement of the additional operating member 252 or 254. The additional operating structure is configured to move the second operation cable 204 to operate the second bicycle component BC2 in response to the movement of the additional operating member 252 or 254.

The additional operating structure is configured to pull or release the second operation cable 204. The additional operating structure is coupled to a derailleur, which is one example of the bicycle transmission, via the second operation cable 204. The second operation cable 204 is an inner cable of a conventional Bowden cable including an outer casing which at least partially covers the inner cable. The additional operating structure can be constructed in any conventional manner and is therefore not discussed in detail herein.

With the bicycle operating device 210, it is possible to obtain substantially the same advantageous effect as that of the bicycle operating device 10 in accordance with the first embodiment.

Third Embodiment

A bicycle operating device 310 in accordance with a third embodiment will be described below referring to FIGS. 15 and 16. The bicycle operating device 310 has the same configuration as the bicycle operating device 210 except for the operating unit 224. Thus, elements having substantially the same function as those in the above embodiments will be numbered the same here, and will not be described and/or illustrated again in detail here for the sake of brevity.

Figure 15:
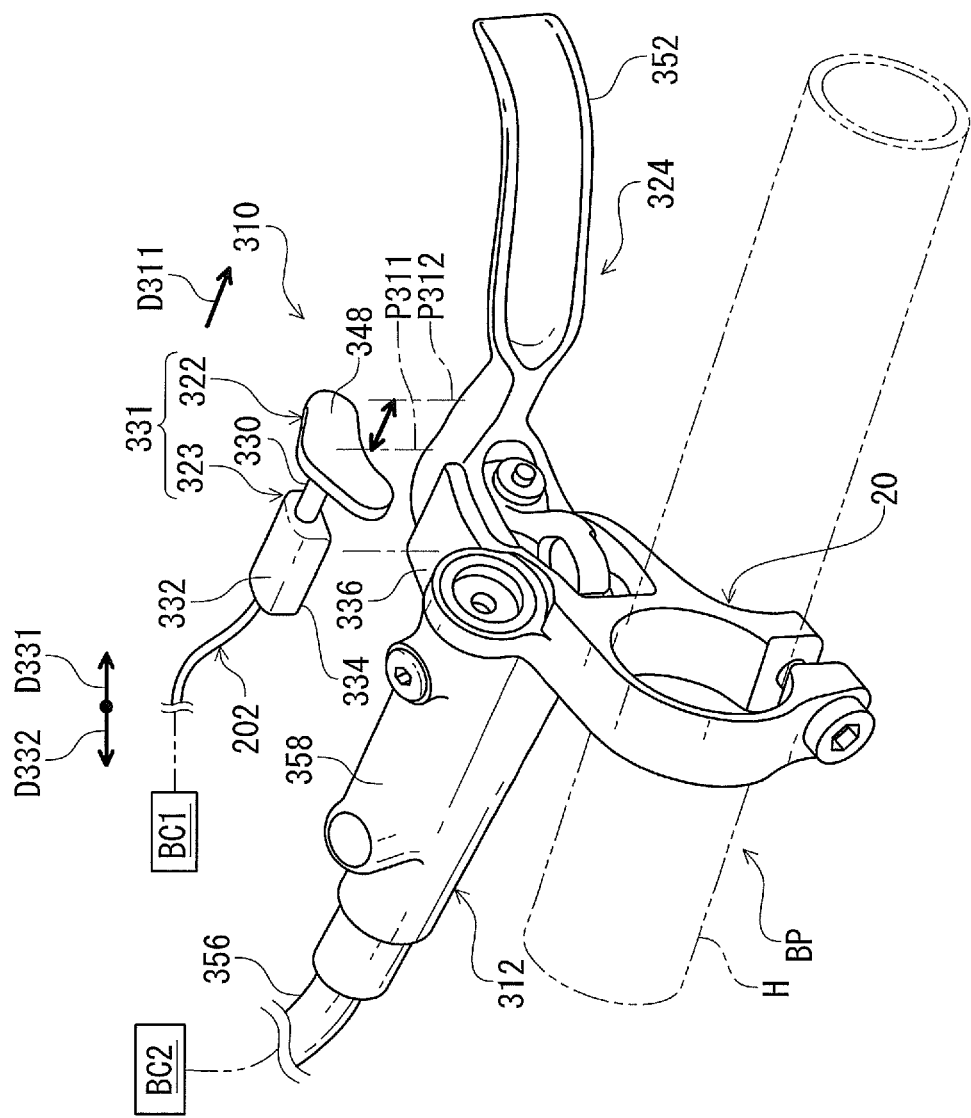
FIG. 15 is an exploded perspective view of a bicycle operating device in accordance with a third embodiment.
Figure 16:
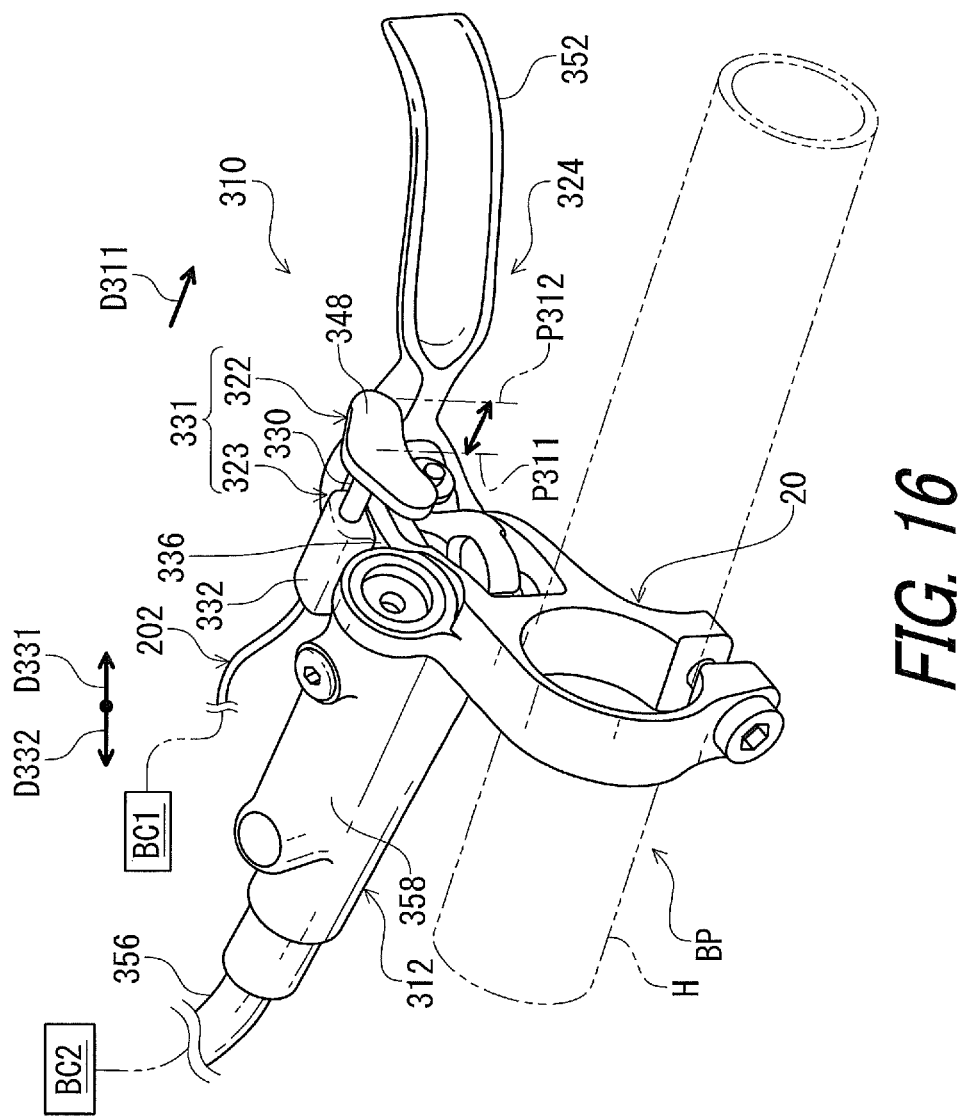
FIG. 16 is a perspective view of the bicycle operating device illustrated in FIG. 15.

As seen in FIGS. 15 and 16, the bicycle operating device 310 comprises a base member 312 and an operating member 322. The base member 312 is configured to be mounted to the bicycle part BP. The operating member 322 is movable relative to the base member 312 between a rest position P311 and an operated position P312. The operating member 322 is movable relative to the base member 312 from the rest position P311 to the operated position P312 in a first operating direction D311.

The bicycle operating device 310 is a right bicycle operating device configured to be operated with a rider's right hand. However, it will be apparent to those skilled in the bicycle field from the present disclosure that the configuration of the bicycle operating device 310 can be applied to a left bicycle operating device as well as the bicycle operating device 10.

As seen in FIGS. 15 and 16, the bicycle operating device 310 comprises an operating structure 323. The operating structure 323 includes a take-up member 330 movable relative to the base member 312 to move the first operation cable 202 in a pulling direction D331 and a releasing direction D332 opposite to the pulling direction D331. The take-up member 330 is configured to move the first operation cable 202 in the pulling direction D331 to operate the first bicycle component BC1 in response to a movement of the operating member 322 from the rest position P311 to the operated position P312. The take-up member 330 is configured such that the first operation cable 202 is movable in the releasing direction D332 in response to a release of the operating member 322 from the operated position P312. For example, the first operation cable 202 is pulled by a biasing member (not shown) provided in the first bicycle component BC1. The operating member 322 and the operating structure 323 provide a cable operating unit 331 configured to perform an operation of the first bicycle component BC1. The operating structure 323 does not include a positioning structure configured to position the take-up member 330 relative to the base member 312 in a state where the operating force is not applied from the rider's finger(s) to the operating member.

In the illustrated embodiment, the take-up member 330 is movable together with the operating member 322. The take-up member 330 is secured to the operating member 322. The take-up member 330 is coupled to the first operation cable 202. The take-up member 330 is integrally provided with the operating member 322 as a single unitary member. However, the take-up member 330 can be a separate member from the operating member 322.

In the illustrated embodiment, as seen in FIGS. 15 and 16, the operating member 322 is configured to be detachably attached to the base member 312. The bicycle operating device 310 includes an attachment member 332 configured to be detachably attached to the base member 312. The attachment member 332 movably supports the take-up member 330. The attachment member 332 has a generally box shape having rectangular surfaces. The attachment member 332 includes an opening 333. The take-up member 330 is slidably provided in the opening 333 of the attachment member 332. Thus, the take-up member 330 is linearly movable relative to the base member 312.

As seen in FIGS. 15 and 16, the attachment member 332 includes an attachment part 334 configured to be detachably attached to the base member 312. The base member 312 includes an attachment area 336 provided on the housing 13 of the base member 312. The attachment part 334 is detachably attached to the attachment area 336 of the base member 312. In this embodiment, the attachment part 334 of the attachment member 332 is detachably disposed to the attachment area 336 in any conventional manner, such as screws, tape or glue. Thus, the cable operating unit 331 is detachably and adjustably attached to the attachment area 336 of the base member 312.

The operating member 322 includes a user interface portion 348 having a user interface surface. The take-up member 330 is slidably disposed on the attachment member 332 and supports the user interface portion 348.

As seen in FIGS. 15 and 16, the cable operating unit 331 is configured to perform an operation of the bicycle height adjustable seatpost (not shown). In more detail, the cable operating unit 331 is configured to operate the first operation cable 202 connected to the bicycle height adjustable seatpost. Accordingly, when the take-up member 330 of the cable operating unit 331 is moved relative to the attachment member 332 in the first operating direction D311, the height of the seat (not shown) of the bicycle is changed. The bicycle height adjustable seatpost can be constructed in any conventional manner and is therefore not discussed in detail herein. The first bicycle component BC1 can be a bicycle suspension. In such an embodiment, when the operating member 322 of the cable operating unit 331 is moved relative to the attachment member 332, the stiffness of the bicycle suspension is altered. The bicycle suspension can be constructed in any conventional manner and is therefore not discussed in detail herein. The cable operating unit 331 can have such a construction that the first operation cable 202 is pulled by moving the operating member 322 in a direction (a direction in which the operating member 322 is pushed) opposite to the first operating direction D311 if needed and/or desired.

As seen in FIGS. 15 and 16, the bicycle operating device 310 comprises an operating unit 324 configured to operate the second bicycle component BC2 in response to an input operation from a user. The operating unit 324 includes an additional operating member 352. The additional operating member 352 is movable relative to the base member 312. The additional operating member 352 is configured as a lever so as to pivotally move with respect to the base member 312.

While the additional operating member 352 is a lever in the illustrated embodiment, the additional operating member 352 is not limited to the lever. Any kind of operating members, e.g. a slidable switch, button and so on, can be applied to the additional operating member 352 if needed and/or desired.

The operating unit 324 is configured to perform an operation of at least one of a bicycle transmission component and a bicycle brake component (not shown both). In one embodiment, the operating unit 324 is configured to perform an operation of the bicycle brake component. For example, the operating unit 324 is a hydraulic brake operating device and is coupled to a hydraulic brake component (not shown), such as a disc caliper brake, via a hydraulic hose 356. The operating unit 324 includes a master cylinder unit 358 having a piston (not shown). The master cylinder unit 358 can be constructed in any conventional manners and is therefore not discussed in detail herein.

With the bicycle operating device 310, it is possible to obtain substantially the same advantageous effect as that of the bicycle operating device 10 in accordance with the first embodiment.

Fourth Embodiment

A bicycle operating device 410 in accordance with a fourth embodiment will be described below referring to FIGS. 17 and 18. The bicycle operating device 410 has the same configuration as the bicycle operating device 10 except for the operating unit 24. Thus, elements having substantially the same function as those in the above embodiments will be numbered the same here, and will not be described and/or illustrated again in detail here for the sake of brevity.

Figure 17:
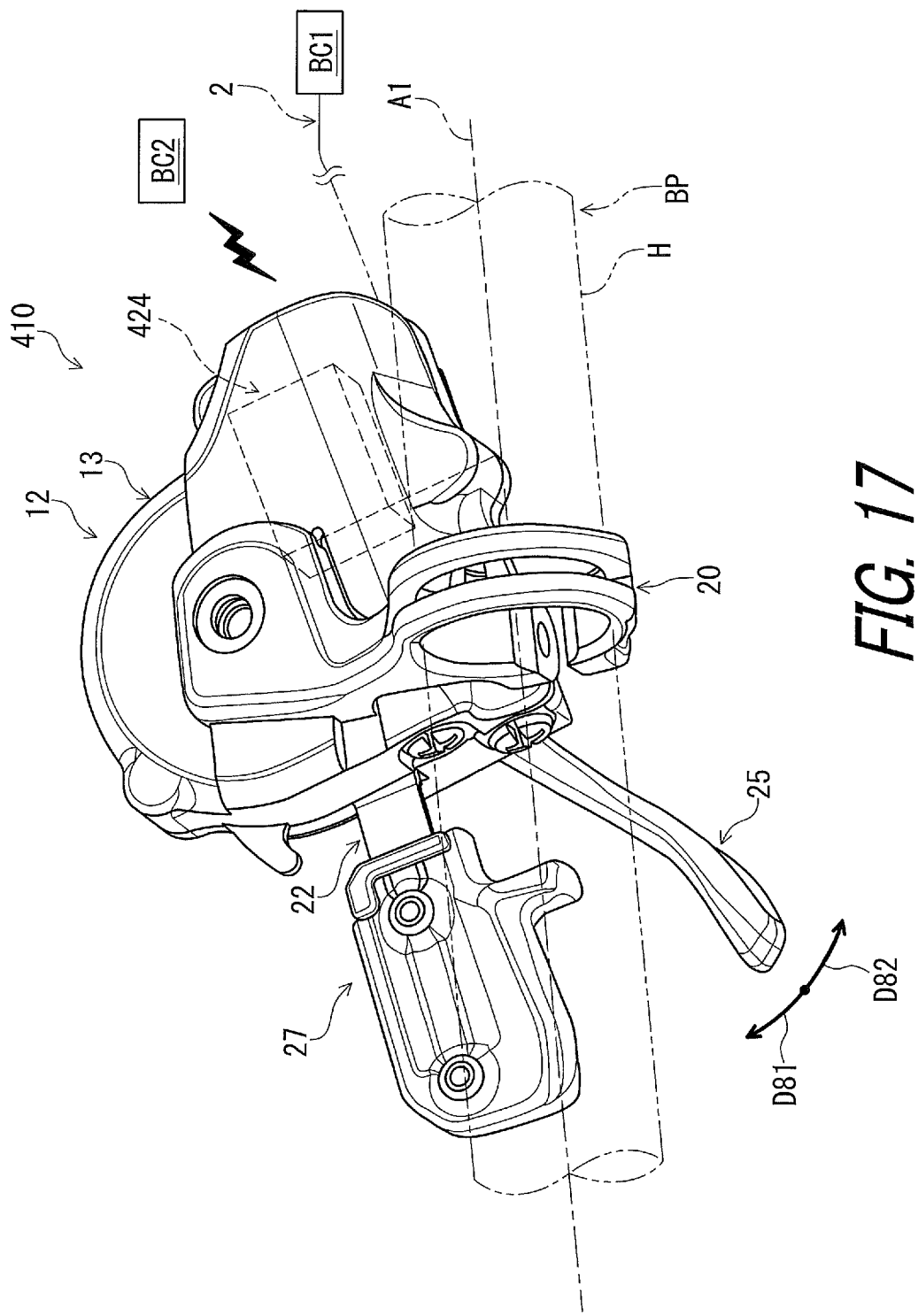
FIG. 17 is a perspective view of a bicycle operating device in accordance with a fourth embodiment.

As seen in FIG. 17, the bicycle operating device 410 comprises the base member 12, the operating member 22, the operating structure 23, the changing structure 27, and an operating unit 424. The operating unit 424 is configured to operate the second bicycle component BC2 in response to an input operation from a user. The operating unit 424 is provided in the housing 13 of the base member 12. The operating unit 424 is configured to establish wireless communication with the second bicycle component BC2.

Figure 18:
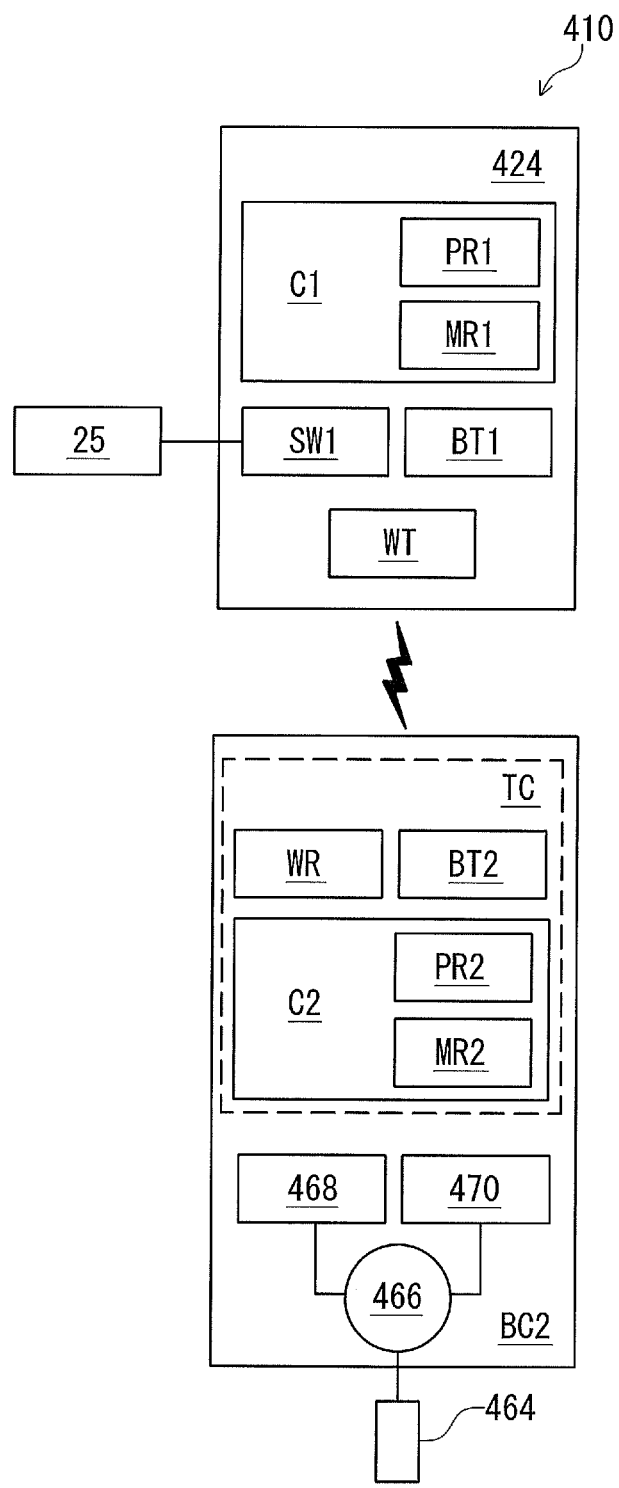
FIG. 18 is a block diagram of a second bicycle component and an operating unit of the bicycle operating device illustrated in FIG. 17.

As seen in FIG. 18, the operating unit 424 includes an electrical switch SW1 and a controller C1. The electrical switch SW1 is configured to receive the input operation from the user. In the illustrated embodiment, the electrical switch SW1 is operatively connected to the additional operating member 25. The electrical switch SW1 is configured to receive the input operation from the user via the additional operating member 25. As seen in FIG. 17, the additional operating member 25 is pivotable relative to the base member 12 in a first operating direction D81 and a second operating direction D82 opposite to the first operating direction D81. The electrical switch SW1 (FIG. 18) is configured to receive two input operations from the user via the additional operating member 25.

As seen in FIG. 18, the controller C1 is configured to generate an operation signal to operate the second bicycle component BC2 in response to the input operation inputted from the electrical switch SW1. The operating unit 424 includes a wireless transmitter WT configured to wirelessly transmit the operation signal to the second bicycle component BC2. The controller C1 is configured to control the wireless transmitter WT to wirelessly transmit the signal to the second bicycle component BC2 in response to the input operation. The controller C1 is configured to be electrically connected to the electrical switch SW1 and the wireless transmitter WT.

As seen in FIG. 18, the controller C1 is constituted as a microcomputer and includes a processor PR1 and a memory MR1. The processor PR1 includes a central processing unit (CPU). The memory MR1 includes a read only memory (ROM) and a random access memory (RAM). For example, a program stored in the memory MR1 is read into the processor PR1, and thereby functions of the controller C1 are performed.

While each of the controller C1 is illustrated as a single unit in FIG. 18, the controller C1 can be part of another component or can be part of several components (e.g., multiple controllers located in different parts).

As seen in FIG. 18, the bicycle operating device 410 includes a power supply device BT1 configured to supply electrical power to the electrical switch SW1, the controller C1, and the wireless transmitter WT. Possible examples of the power supply device BT1 include a battery.

In the illustrated embodiment, the second bicycle component BC2 is an electrical bicycle component such as an electrical bicycle transmission. Possible examples of the electrical bicycle component include an electrical front derailleur and an electrical rear derailleur. As seen in FIG. 18, for example, the second bicycle component BC2 includes a chain guide 464, a guide actuator 466, a position sensor 468, a driver unit 470, and a transmission controller TC. The chain guide 464 is configured to shift a bicycle chain (not shown) between a plurality of sprockets (not shown). The guide actuator 466 is configured to move the chain guide 464 to shift the bicycle chain. Possible examples of the guide actuator 466 include a direct current motor and a stepper motor.

The position sensor 468 is configured to sense a current position of the guide actuator 466 for determining a current gear position of the second bicycle component BC2. Possible examples of the position sensor 468 include a potentiometer, a rotary encoder, and a hall sensor. The driver unit 470 is configured to control the guide actuator 466 based on the current position of the guide actuator 466 and driving signals from the transmission controller TC. The transmission controller TC is configured to generate the driving signals based on the operation signal from the bicycle operating device 410.

The transmission controller TC includes a wireless receiver WR and a control unit C2. The wireless receiver WR is configured to wirelessly receive signals from the wireless transmitter WT. The control unit C2 is configured to interpret the operation signal transmitted from the wireless transmitter WT. The transmission controller TC includes a power supply device BT2 configured to supply electrical power to the control unit C2 and the wireless receiver WR. Since the operation of the operating unit 424 and the second bicycle component BC2 is known in the bicycle field, it will not be described in detail here for the sake of brevity.

With the bicycle operating device 410, it is possible to obtain substantially the same advantageous effect as that of the bicycle operating device 10 in accordance with the first embodiment.

In the present application, the term "attached" or "attaching", as used herein, encompasses configurations in which an element is directly attached to another element by affixing the element directly to the other element; configurations in which the element is indirectly attached to the other element via the intermediate member(s); and configurations in which one element is integral with another element, i.e. one element is essentially part of the other element. This concept also applies to words of similar meaning, for example, "joined", "connected", "coupled", "mounted", "bonded", "fixed" and their derivatives.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part" and "element" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle operating device comprising:
a base member configured to be mounted to a bicycle part;
an operating member movable relative to the base member between a rest position and an operated position;
an operating structure including a take-up member movable relative to the base member to move a first operation cable in a pulling direction and a releasing direction opposite to the pulling direction, the take-up member coupling the first operation cable to the operating member to move the first operation cable in the pulling direction to operate a first bicycle component in response to a movement of the operating member from the rest position to the operated position, the take-up member being configured such that the first operation cable is movable in the releasing direction in response to a release of the operating member from the operated position; and
an operating unit mounted to the base member to operate a second bicycle component in response to an input operation from a user, the operating unit including:
an electrical switch configured to receive the input operation from the user; and
a controller configured to generate an operation signal to operate the second bicycle component in response to the input operation inputted from the electrical switch, wherein
the operating unit includes a wireless transmitter configured to wirelessly transmit the operation signal to the second bicycle component.

2. The bicycle operating device according to claim 1, further comprising
an additional operating member, wherein
the electrical switch is configured to receive the input operation from the user via the additional operating member.

3. The bicycle operating device according to claim 2, wherein
the additional operating member is pivotable relative to the base member.

4. The bicycle operating device according to claim 3, wherein
the additional operating member is pivotable relative to the base member in a first operating direction and a second operating direction opposite to the first operating direction, and
the electrical switch is configured to receive two input operations from the user via the additional operating member.

5. The bicycle operating device according to claim 1, wherein
the controller is configured to control the wireless transmitter to wirelessly transmit the signal to the second bicycle component in response to the input operation.

6. The bicycle operating device according to claim 1, wherein
the controller is electrically connected to the electrical switch and the wireless transmitter to control the wireless transmitter in response to the input operation received by the electrical switch.

7. The bicycle operating device according to claim 1, further comprising
a power supply device configured to supply electrical power to the controller.

8. The bicycle operating device according to claim 1, wherein
the base member includes a housing in which the operating structure and the operating unit are provided.

9. The bicycle operating device according to claim 1, wherein
the second bicycle component comprises an electrical bicycle component.

10. The bicycle operating device according to claim 9, wherein
the electrical bicycle component comprises an electrical derailleur.

11. A bicycle operating device comprising:
a base member configured to be mounted to a bicycle part;
an operating member movable relative to the base member between a rest position and an operated position;
an operating structure including a take-up member movable relative to the base member to move a first operation cable in a pulling direction and a releasing direction opposite to the pulling direction, the take-up member coupling the first operation cable to the operating member to move the first operation cable in the pulling direction to operate a first bicycle component in response to a movement of the operating member from the rest position to the operated position, the take-up member being configured such that the first operation cable is movable in the releasing direction in response to a release of the operating member from the operated position; and an operating unit mounted to the base member to operate a second bicycle component in response to an input operation from a user, the operating unit including:

an electrical switch configured to receive the input operation from the user; and a controller configured to generate an operation signal to operate the second bicycle component in response to the input operation inputted from the electrical switch, wherein the first bicycle component comprises a height adjustable seatpost assembly.

12. A bicycle operating device comprising:

a base member configured to be mounted to a bicycle part;

an operating member movable relative to the base member between a rest position and an operated position;

an operating structure including a take-up member movable relative to the base member to move a first operation cable in a pulling direction and a releasing direction opposite to the pulling direction, the take-up member coupling the first operation cable to the operating member to move the first operation cable in the pulling direction to operate a first bicycle component in response to a movement of the operating member from the rest position to the operated position, the take-up member being configured such that the first operation cable is movable in the releasing direction in response to a release of the operating member from the operated position; and an operating unit mounted to the base member to operate a second bicycle component in response to an input operation from a user, the operating unit including:

an electrical switch configured to receive the input operation from the user; and a controller configured to generate an operation signal to operate the second bicycle component in response to the input operation inputted from the electrical switch, wherein the first bicycle component comprises a bicycle suspension.

* * * * *